(12) United States Patent
Mulcahy et al.

(10) Patent No.: US 10,963,147 B2
(45) Date of Patent: Mar. 30, 2021

(54) MEDIA-AWARE INTERFACE

(71) Applicant: MICROSOFT TECHNOLOGY LICENSING, LLC, Redmond, WA (US)

(72) Inventors: Kathleen Patricia Mulcahy, Seattle, WA (US); Shiraz Cupala, Seattle, WA (US); John Darren Elliott, Lake Forest Park, WA (US); Wyatt Douglas Jackson, Bothell, WA (US); Hansen Liou, Bellevue, WA (US); Alain P. Maillot, Redmond, WA (US); Neil Warren Black, Seattle, WA (US); Joshua C. Zana, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/018,583

(22) Filed: Jun. 26, 2018

(65) Prior Publication Data
US 2018/0300050 A1    Oct. 18, 2018

Related U.S. Application Data

(63) Continuation of application No. 13/795,622, filed on Mar. 12, 2013, now Pat. No. 10,025,478.
(Continued)

(51) Int. Cl.
*H04N 5/445*         (2011.01)
*G06F 3/0484*       (2013.01)
(Continued)

(52) U.S. Cl.
CPC .......... *G06F 3/04847* (2013.01); *A63F 13/06* (2013.01); *A63F 13/235* (2014.09);
(Continued)

(58) Field of Classification Search
CPC .............. H04N 21/23; H04N 21/8173; H04N 21/4781; H04N 21/4722; H04N 21/4122;
(Continued)

(56) References Cited

U.S. PATENT DOCUMENTS

| | | | |
|---|---|---|---|
| 5,516,105 A | 5/1996 | Eisenbrey et al. | |
| 6,256,019 B1 | 7/2001 | Allport | |

(Continued)

FOREIGN PATENT DOCUMENTS

| | | | |
|---|---|---|---|
| CN | 1788457 A | 6/2006 | |
| CN | 100493091 C | 5/2009 | |

(Continued)

OTHER PUBLICATIONS

"Office Action and Search Report Issued in Taiwan Patent Application No. 103101834", dated Sep. 5, 2017, 5 Pages.
(Continued)

*Primary Examiner* — Pankaj Kumar
*Assistant Examiner* — Sahar Aqil Riaz

(57) ABSTRACT

Embodiments of the invention provide a companion application that allows users to discover secondary content that supplements primary content that the user is enjoying and to run the secondary content within the application. Examples of primary content include, games, television shows, movies, and music. In one embodiment, a companion application runs on both the primary device, which is the device generating the primary content, and on the companion device. The companion application helps the user discover available secondary content. In addition to discovering secondary content that may be relevant to the user, the companion application includes an application-run environment in which secondary content applications may run.

20 Claims, 17 Drawing Sheets

Related U.S. Application Data

(60) Provisional application No. 61/654,638, filed on Jun. 1, 2012.

(51) Int. Cl.

| | | |
|---|---|---|
| *G06F 3/041* | (2006.01) | |
| *G06F 3/033* | (2013.01) | |
| *G06F 3/0354* | (2013.01) | |
| *G06F 3/0488* | (2013.01) | |
| *G06F 9/451* | (2018.01) | |
| *A63F 13/20* | (2014.01) | |
| *H04L 29/06* | (2006.01) | |
| *G06F 3/048* | (2013.01) | |
| *H04N 21/4722* | (2011.01) | |
| *G06F 3/01* | (2006.01) | |
| *A63F 13/235* | (2014.01) | |
| *A63F 13/493* | (2014.01) | |
| *A63F 13/812* | (2014.01) | |
| *G06K 9/00* | (2006.01) | |
| *A63F 13/50* | (2014.01) | |
| *H04N 21/41* | (2011.01) | |
| *H04N 21/845* | (2011.01) | |
| *H04N 21/478* | (2011.01) | |
| *G06F 16/48* | (2019.01) | |
| *G06F 40/169* | (2020.01) | |

(52) U.S. Cl.
CPC ............ *A63F 13/493* (2014.09); *A63F 13/50* (2014.09); *A63F 13/812* (2014.09); *G06F 3/011* (2013.01); *G06F 3/017* (2013.01); *G06F 3/033* (2013.01); *G06F 3/03547* (2013.01); *G06F 3/041* (2013.01); *G06F 3/048* (2013.01); *G06F 3/0412* (2013.01); *G06F 3/0484* (2013.01); *G06F 3/04883* (2013.01); *G06F 9/451* (2018.02); *G06K 9/00335* (2013.01); *H04L 65/403* (2013.01); *H04N 21/4722* (2013.01); *G06F 16/489* (2019.01); *G06F 40/169* (2020.01); *H04L 65/4015* (2013.01); *H04N 21/4122* (2013.01); *H04N 21/4781* (2013.01); *H04N 21/8455* (2013.01)

(58) Field of Classification Search
CPC . H04N 21/8455; G06F 3/04847; G06F 3/011; G06F 3/041; G06F 3/033; G06F 40/169; G06F 16/489; G06F 3/01; G06F 9/44; G06F 9/451; G06F 3/0412; G06F 3/03547; G06F 3/04883; G06F 3/017; G06F 3/0484; G06F 3/048; A63F 13/50; A63F 13/235; A63F 13/493; A63F 13/812; A63F 13/06; G06K 9/00335; H04L 65/4015; H04L 65/403
USPC .......................... 725/43, 51, 59, 61
See application file for complete search history.

(56) References Cited

U.S. PATENT DOCUMENTS

| | | |
|---|---|---|
| 6,709,330 B1 | 3/2004 | Klein et al. |
| 7,127,613 B2 | 10/2006 | Pabla et al. |
| 8,255,006 B1 | 8/2012 | Chavez et al. |
| 8,464,160 B2 | 6/2013 | Sakata et al. |
| 8,745,154 B1 | 6/2014 | Froment et al. |
| 8,760,426 B1 | 6/2014 | Strand |
| 8,880,623 B2* | 11/2014 | McIntosh ......... H04N 21/25891 709/206 |
| 8,965,986 B1 | 2/2015 | Acharya et al. |
| 9,170,667 B2 | 10/2015 | Stachniak et al. |
| 9,265,450 B1 | 2/2016 | Giobbi |
| 9,342,139 B2 | 5/2016 | Adermann et al. |
| 9,381,427 B2 | 7/2016 | Elliott et al. |
| 9,690,465 B2 | 6/2017 | Tuck et al. |
| 9,703,940 B2 | 7/2017 | Forbes et al. |
| 9,798,457 B2 | 10/2017 | Cupala et al. |
| 10,701,447 B2* | 6/2020 | Meyer .............. H04N 21/44222 |
| 2002/0065566 A1 | 5/2002 | Aronson et al. |
| 2002/0065715 A1* | 5/2002 | Tennyson ............ G06Q 30/0274 705/14.7 |
| 2003/0003991 A1 | 1/2003 | Kuraishi et al. |
| 2003/0028390 A1 | 2/2003 | Stern et al. |
| 2004/0155962 A1 | 8/2004 | Marks |
| 2007/0130399 A1 | 6/2007 | Anderson et al. |
| 2007/0298882 A1 | 12/2007 | Marks et al. |
| 2008/0165255 A1 | 7/2008 | Christie |
| 2008/0267447 A1 | 10/2008 | Kelusky et al. |
| 2009/0017853 A1 | 1/2009 | Ozog et al. |
| 2009/0048021 A1 | 2/2009 | Lian et al. |
| 2009/0228841 A1 | 9/2009 | Hildreth |
| 2009/0244003 A1 | 10/2009 | Bonnat |
| 2009/0249208 A1* | 10/2009 | Song .................... G11B 27/105 715/721 |
| 2010/0142924 A1* | 6/2010 | Yamashita ............ G11B 27/10 386/241 |
| 2010/0272420 A1* | 10/2010 | Soohoo ............ H04N 21/47214 386/291 |
| 2010/0277411 A1 | 11/2010 | Yee et al. |
| 2010/0318520 A1* | 12/2010 | Loeb ................ G06F 17/30038 707/743 |
| 2011/0001813 A1 | 1/2011 | Kim et al. |
| 2011/0007079 A1 | 1/2011 | Perez et al. |
| 2011/0105226 A1 | 5/2011 | Perlman |
| 2011/0106736 A1 | 5/2011 | Aharonson et al. |
| 2011/0107369 A1* | 5/2011 | O'Brien ............... G11B 27/034 725/38 |
| 2011/0175810 A1 | 7/2011 | Markovic et al. |
| 2011/0239142 A1* | 9/2011 | Steeves .................. G06F 3/14 715/764 |
| 2011/0275358 A1 | 11/2011 | Faenger et al. |
| 2011/0279368 A1 | 11/2011 | Klein et al. |
| 2011/0310002 A1 | 12/2011 | Tidemand et al. |
| 2012/0028625 A1 | 2/2012 | Konig |
| 2012/0151320 A1* | 6/2012 | McClements, IV ........................ G11B 27/034 715/230 |
| 2012/0246301 A1 | 9/2012 | Vyrros et al. |
| 2012/0268360 A1 | 10/2012 | Mikhailov |
| 2012/0270644 A1 | 10/2012 | Buhr |
| 2012/0276994 A1 | 11/2012 | Lansdale et al. |
| 2013/0013991 A1* | 1/2013 | Evans .................... H04N 5/765 715/206 |
| 2013/0019192 A1 | 1/2013 | Itoh et al. |
| 2013/0031462 A1 | 1/2013 | Calvo et al. |
| 2013/0109369 A1 | 5/2013 | Forutanpour et al. |
| 2013/0174191 A1* | 7/2013 | Thompson, Jr. ... G06Q 30/0207 725/23 |
| 2013/0215116 A1* | 8/2013 | Siddique ............ G06Q 30/0643 345/420 |
| 2013/0325954 A1 | 12/2013 | Cupala et al. |
| 2013/0326376 A1 | 12/2013 | Stachniak et al. |
| 2014/0007156 A1* | 1/2014 | Navin ..................... H04L 63/10 725/32 |
| 2014/0067946 A1* | 3/2014 | Bruich ............... H04N 21/2668 709/204 |
| 2014/0201378 A1 | 7/2014 | Elliott et al. |
| 2014/0306877 A1 | 10/2014 | Katz et al. |
| 2016/0004301 A1 | 1/2016 | Stachniak et al. |
| 2019/0220181 A1 | 7/2019 | Stachniak et al. |

FOREIGN PATENT DOCUMENTS

JP       2010179088 A      8/2010

(56) References Cited

FOREIGN PATENT DOCUMENTS

| RU | 2417437 C2 | 4/2011 |
| WO | 2012120958 A1 | 9/2012 |

OTHER PUBLICATIONS

"Non Final Office action Issued in U.S. Appl. No. 13/723,365", dated Sep. 30, 2016, 23 Pages.

"Final Office Action Issued in U.S. Appl. No. 14/856,281", dated Jul. 6, 2018, 13 Pages.

"Office Action Issued Issued in European Patent Application No. 14703967.1", dated Jul. 24, 2018, 7 Pages.

"First Office Action and Search Report Issued in Chinese Application No. 201380028950.9", dated Jul. 5, 2016, 15 Pages.

"Second Office Action Issued in Chinese Patent Application No. 201380028950.9", dated Mar. 13, 2017, 10 Pages.

"Third Office Action Issued in Chinese Patent Application No. 201380028950.9", dated Jun. 19, 2017, 6 Pages.

"Office Action Issued in Russian Patent Application No. 2014148164", dated May 17, 2017, 7 Pages.

"First Office Action and Search Report Issued in Chinese Patent Application No. 201480005237.7", dated Feb. 17, 2017, 15 Pages.

"Office Action Issued in Chinese Patent Application No. 201480005237.7", dated Sep. 22, 2017, 12 Pages.

"Second Office Action Issued in Chinese Patent Application No. 201480005237.7", dated May 2, 2017, 13 Pages.

"International Preliminary Report on Patentability Issued in PCT Application No. PCT/US2014/011373", dated May 6, 2015, 7 Pages.

"Second Written Opinion Issued in PCT Application No. PCT/US2014/011373", dated Jan. 23, 2015, 7 Pages.

"Office Action Issued in European Patent Application No. 13728598.7", dated Oct. 18, 2017, 6 Pages.

"Office Action Issued in Canadian Patent Application No. 2,874,667", dated Mar. 1, 2019, 3 Pages.

"Office Action Issued in Korean Patent Application No. 10-2014-7037015", dated Sep. 4, 2019, 9 Pages.

"Second Screen", Retrieved from: https://en.wikipedia.org/w/index.php?title=Second_screen&oldid=533430314, Jan. 16, 2013, 4 Pages.

"XEP-0174: Serverless Messaging", Retrieved from: https://web.archive.org/web/20121105155947if_/https://xmpp.org/extensions/xep-0174.html, Nov. 5, 2012, 24 Pages.

"Summons to Attend Oral Proceedings Issued in European Patent Application No. 14703967.1", Mailed Date: Feb. 18, 2020, 9 Pages.

"Office Action Issued in Indian Patent Application No. 8333/CHENP/2014", dated Feb. 21, 2020, 7 Pages.

"Office Action Issued in Brazilian Patent Application No. BR112014029915.3", dated Jan. 3, 2020, 5 Pages.

"Extended European Search Report Issued in European Patent Application No. 20150793.6", dated Apr. 24, 2020, 8 Pages.

"Non-Final Office Action Issued in U.S. Appl. No. 16/361,522", dated Oct. 23, 2020, 18 Pages.

"Office Action Issued in European Patent Application No. 20150793.6", dated Dec. 22, 2020, 7 Pages.

* cited by examiner

MEDIA-AWARE INTERFACE

CROSS-REFERENCE TO RELATED DOCUMENTS

This application is a continuation of U.S. patent application Ser. No. 13/795,622, filed on Mar. 12, 2013, issued as U.S. Pat. No. 10,025,478, which application claims the benefit of priority to U.S. Provisional Application No. 61/654,638, filed Jun. 1, 2012, and titled "Companion Experiences," the entirety of both applications are hereby incorporated by reference.

BACKGROUND

People enjoy watching movies and television shows and playing video games. In addition to watching the movies, games, or television shows, people may seek additional information related to the games, shows, or other primary content. For example, users may search the Internet for information about an actor appearing in a movie using a PC, smartphone or tablet. Using a second device for searching allows the user to search without disrupting the primary content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a companion application that allows users to discover secondary content that supplements primary content the user is enjoying and run the secondary content within the application. Examples of primary content include games, television shows, movies, and music. In one embodiment, a companion application runs on both the primary device, which is the device generating the primary content, and on the companion device.

The companion application helps the user discover available secondary content. To discover the content, the companion application first determines what content is playing or active on the primary device. The primary device may communicate with the companion application to provide information describing the state of the primary content. Once the companion application receives this state information, the companion application may access a secondary content catalog hosted on a server, on the companion device, the primary device, or other source. The discovered secondary content is presented to the user for selection.

In addition to discovering secondary content that may be relevant to the user, the companion application includes an application-run environment in which secondary content applications may run. In one embodiment, the application environment is an HTML rendering space that allows developers to write secondary content applications using HTML. The companion application may also include a series of APIs that allow the secondary content to access some of the companion device's resources. For example, an API through which a secondary content application is able to access touch screen, gyroscope, or accelerometer data may be included in the companion application. The companion application may also handle form factor and platform adaptation to allow a single secondary content application to run on multiple platforms and on devices having multiple form factors. Communications between a companion application running on a companion device and the companion application running on the primary device may be handled using a generic pipeline, which is described herein. Some communications may occur over different communication technology.

BRIEF DESCRIPTION OF THE DRAWINGS

Embodiments of the invention are described in detail below with reference to the attached drawing figures, wherein.

DETAILED DESCRIPTION

Figure 1:
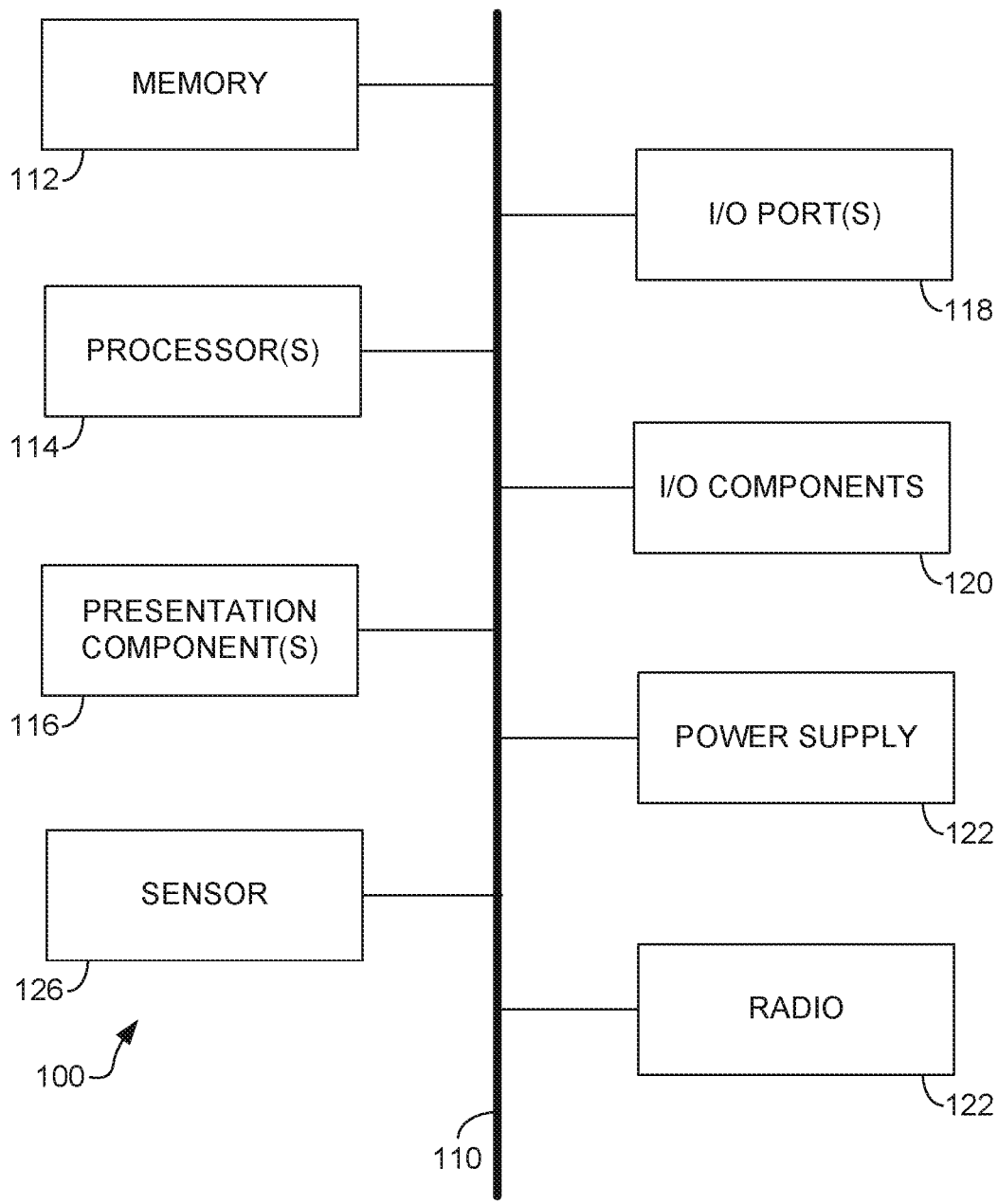
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a companion application that allows users to discover secondary content that supplements primary content the user is enjoying. Examples of primary content include games, television shows, movies, and music. The companion application may run on a companion device, such as a smart phone or tablet. The companion application interacts with a device that is generating the primary content. For example, the companion application may interact with a game console, media player, cable box, DVR, personal computer, tablet, smartphone, or smart television that is generating the primary content. The primary device may include a display or may output the primary content to a separate display.

In one embodiment, a companion application runs on both the primary device, which is the device generating the primary content, and on the companion device. The two applications may work together to provide a unified companion experience. For example, the applications may communicate with each other through a communication channel that the two applications establish. The communication channel may be wired or wireless. Accordingly, the companion application helps two devices communicate and communicates with applications running on the primary and companion device as needed to facilitate a companion experience.

The companion application helps the user discover available secondary content. To discover the content, the companion application first determines what content is playing or active on the primary device. Throughout this application, the content playing or active on the primary device is described as the primary content. When several titles or applications are active, the primary content may be the application consuming the most screen real estate. In another embodiment, different applications are preferentially selected by the user as the primary content. The primary device may communicate with the companion application to provide information describing the state of the primary content. The state information may include the title of the primary content, along with progress information. For example, the progress could indicate that the primary content is one hour and 33 minutes into a two-hour presentation.

Once the companion application receives this state information, the companion application may access a secondary content catalog hosted on a server, on the companion device, the primary device, or other source. The catalog may list content that is associated with the primary content. In addition, various triggers may be associated with the secondary content. For example, the secondary content may be associated with a point in the progress of the media. With a game, different secondary content may be associated with different game levels. Similarly, different secondary content may be associated with different progress points in a television show or movie. Secondary content could also be related to other program information such as the actor appearing on screen, present game level, how many points a player has in a game, etc.

Other triggers include the user's behavior with reference to the primary content or otherwise. For example, if the user appears to be stuck at a certain point in a game, secondary content providing help resources may be preferentially surfaced by the companion application. Additionally, the user's previous activities may be used to select and present secondary content. For example, the user typically accesses a secondary content game map when reaching each new level of a game, then the map application for the next level could be preferentially displayed upon determining that the user has reached a new level in the game.

In addition to discovering secondary content that may be relevant to the user, the companion application includes an application-run environment in which secondary content applications may run. In one embodiment, the application environment is an HTML canvas that allows developers to write secondary content applications using HTML. The companion application may also include a series of APIs that allow the secondary content to access some of the companion device's resources. For example, an API through which a secondary content application is able to access touch screen, gyroscope, or accelerometer data may be included in the companion application. In addition, the companion application may handle communication updates on behalf of the secondary content application. For example, state information received from the primary device may be communicated to the secondary content application.

The companion application may also handle form factor and platform adaptation to allow a single secondary content application to run on multiple platforms and on devices having multiple form factors. Communications between a companion application running on a companion device and the companion application running on the primary device may be handled using a generic pipeline, which is described herein. Some communications may occur over different communication technology.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| ADK | XBOX Application Development Kit |
| API | Application Programming Interface |
| JSON | Java Script Object Notation |
| LRC | Living Room Companion |
| SDK | Software Development Kit |
| SDP | Service Discovery Protocol |
| TCP | Transmission Control Protocol |
| TMF | Transmedia Foundation |
| UDP | User Datagram Protocol |
| XAM | XBOX System Services |
| XamLrc | XAM library for LRC |
| XDK | XBOX Development Kit |
| XLrc | XDK title library for LRC |

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits and/or receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Figure 2:
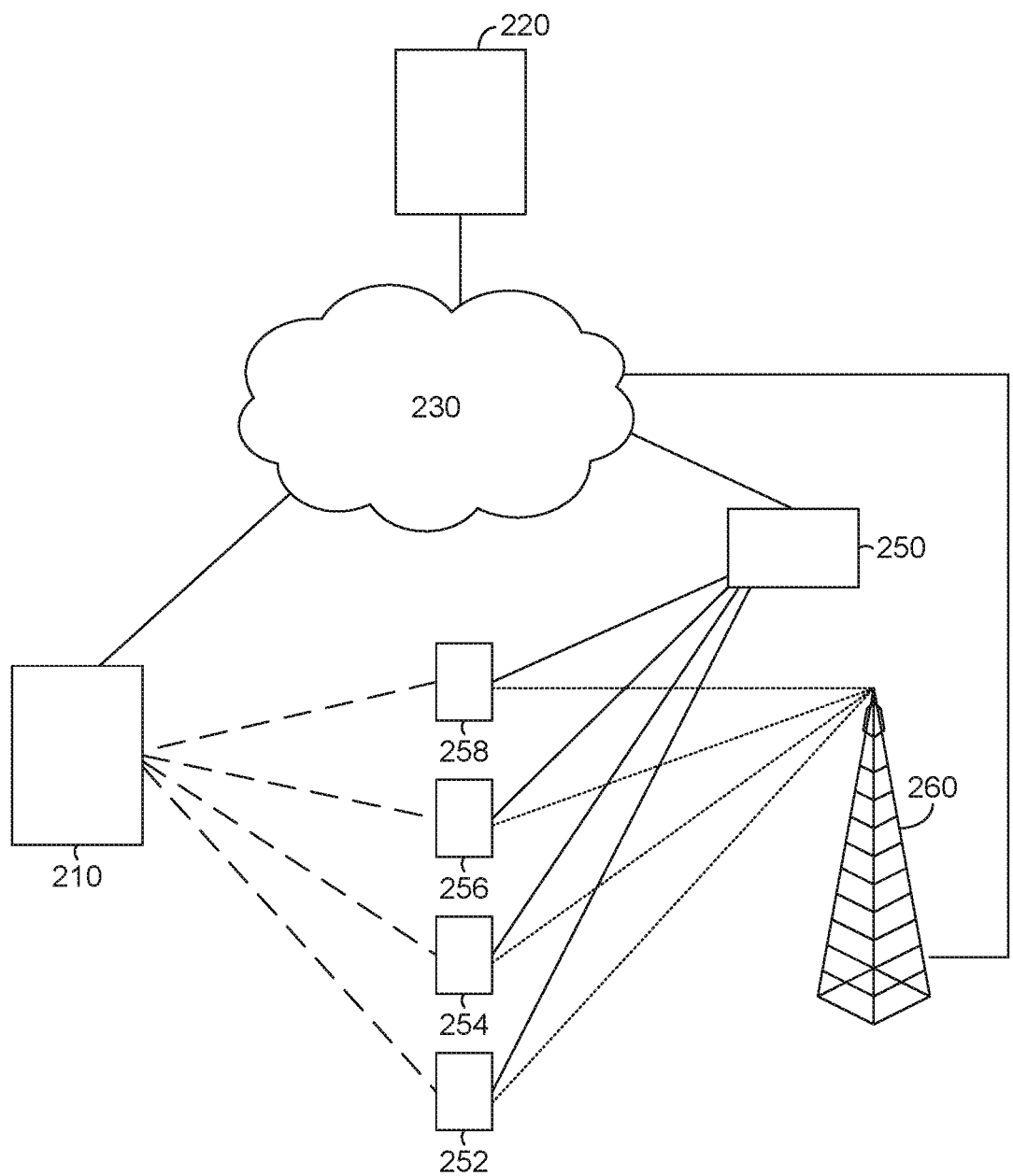
FIG. 2 is a diagram illustrating a variety of communication mediums between game consoles, game services, and companion devices, in accordance with an embodiment of the present invention.

Turning now to FIG. 2, a networked operating environment 200 comprising multiple computing devices that can provide a companion experience is shown, in accordance with embodiments of the present invention. The networked operating environment 200 shown in FIG. 2 is an example of one suitable networked operating environment 200. The networked operating environment 200 comprises multiple computing devices similar to the computing device 100 described with reference to FIG. 1. The networked operating environment 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the network environment.

The environment 200 includes a base platform 210, companion platforms 252, 254, 256, and 258, a wireless router 250, a base station 260, a network 230 and a companion experience server 220. These devices are merely exemplary and are not intended to be limiting. The base platform 210 may be a game console, media console, or other suitable computing device that presents base platform applications (hereinafter "titles"). Titles may be games, movies, applications, music, videos, television shows, and other media content. The game console may be coupled to a display, such as a television. The companion platforms 252, 254, 256, and 258 are computing devices. A companion platform, as used in this application, is a personal computing device that provides a second display. Examples include laptops, PCs, netbooks, smartphones, e-readers, PDAs, and tablets. A companion experience allows the user to interact with content related to media content playing on a base platform 210 through interfaces on the companion platform. The companion experience may also allow the user to control the media presentation through an interface on the companion platform. The companion experience server 220 facilitates companion experiences by providing companion content, companion applications, registering and authenticating companion platforms, facilitating communications between primary devices and companion platforms, and performing other tasks. The companion experience server may be accessed via a wide-area network, such as the Internet.

The companion platforms 252, 254, 256, and 258 may communicate directly with the base platform 210 via a direct connection (e.g., local area network wired/wireless connection or Bluetooth). The direct connection—local network connection—may be generated by the wireless router 250. The companion platforms 252, 254, 256, and 258 may also communicate indirectly with the base platform 210 via an indirect connection (e.g., wide area network connection) routed through the companion experience server 220 (e.g., Internet-service connection). The Internet-service connection i.e., a wide area network connection that connects through a TMF services may be facilitated by base station 260. The base station 260 could route communications to the base platform through whatever communication to the network 230 the base platform is using through the companion experience server. Whenever possible messages will be delivered over the local network connection, typically Wi-Fi, but some devices might be wired. In cases, the companion platform may not be able connect over the local network connection. In these cases, the device will use the TMF service over the Internet (e.g., ISP, 3G, 4G) to deliver generic messages (e.g., companion platform message or base platform message). Determining a connection to route a message is based in part on identifying the connection that exists between the base platform 210 and the companion platform. Identifying what connection exists includes using networking tools (e.g., ping, ip configuration, ip addresses) within the platforms to identify a local or a wide area network connection. In embodiments, Titles and hosted applications can determine from per-client data whether their connection is a local or wide area network connection.

As illustrated in FIG. 2, companion experiences require the base platform and companion platform to communicate with each other. Though described as the platforms communicating, in reality it may include, various applications running on the devices, in conjunction with operating systems, communicating with each other. Embodiments of the present invention provide a generic companion-messaging mechanism that allows applications that have different operating systems, hardware, and for using different software languages to communicate with each other. Generic companion-messaging will be described in more detail with reference to FIGS. 3-9. For the sake of illustration, generic companion-messaging will be described in the context of a console (as a base platform) and a device (as a companion platform), but embodiments are not limited to a console. The base platform could be a game console, PC, Smart TV, cable box, DVR, or other device that outputs content. The companion platform may be a smart phone, tablet, or other platform.

Generic Messaging

Some embodiments of the media aware interface use a primary device and a companion device. Communications are exchanged between these two devices. Some of these communications may occur using a generic messaging platform. Various aspects of the generic messaging technology described herein are generally directed to communicating via a generic companion-messaging session that includes a base platform running a base platform application (e.g., title) and a companion platform running a companion platform application (e.g., LRC with a hosted application). Embodiments of the invention provide underlying communication functionality to enable companion experiences using messages routed during a generic companion-messaging session. A media platform (e.g., computing device, game console, television, tablet, or other touch-screen device) communicates with another media platform via a determined connection for the generic companion-messaging session. A media platform may support several different types of digital media content. The media platform may also include support applications (e.g., titles or hosted application) for using digital media content. Digital media content ("media content") may generally refer to information delivered to an end-user in specific contexts (e.g., listening to music, watching movies, playing video games). Media content may be broadcast, streamed, or accessed from media storage (e.g., local hard drive or network locations) on the media platform display. The media platform may include several different control features (e.g., remotes or controllers) and interface features (e.g., display interface, gesture interface) that allow users to use the media content.

A media platform may be a companion platform or a base platform. The companion platform and the base platform are media platforms that play specific roles in a generic companion-messaging session. A companion platform, as used in this application, is a personal computing device that provides a second display screen. Examples include laptops, PCs, netbooks, smartphones, e-readers, PDAs, and tablets. In embodiments, the companion platform may be a secondary platform to the primary base platform usually with a first display screen. It is also contemplated with the scope of this invention that the companion platform may also be the base platform running the companion platform application on a second display interface.

A companion experience allows the user to interact with content playing on the primary base platform, or supplemental content related to the media content, through a companion platform. The companion platform runs a companion platform application (e.g., hosted application) that provides controls, additional information, and interaction with a base platform application (e.g., title). The companion platform application communicates with base platform application running on the base-platform (e.g., a game console, PC, TV, or other companion platform) to provide additional interface options on the companion platform. For example, the companion platform may provide supplemental game information, such as play tips downloaded from a tip site, to help the user with the game playing on a game console.

Companion experiences provide for a phone, tablet, or other companion device to be used to navigate a base platform application or used as a second screen companion for a TV or other primary device as the companion platform automatically serves extended experiences and interactive experiences (e.g. behind-the-scenes commentary and real-time game strategy) for different types of media content (e.g., movies and games). In particular, such companion experience may be presented on the companion platform using dynamic scriptable rendering. Dynamic scriptable rendering may be a canvas element (e.g., HTML5 Canvas) that allows scripts to generate graphics in real-time. The Canvas includes drawing regions defined in HTML code (e.g., height and width attributes) and using drawing functions to render graphics. The graphics in this case are displayed on the companion application and associated with content, interfaces, and actions performed on the base platform.

The generic companion-message session automatically pairs the base platform application and the companion platform application such that an abstraction layer of the base platform application and an abstraction layer of the companion platform application may route and encrypt messages. The abstraction layer (e.g., APIs and XDK) hides the implementation details of a generic companion-messaging session to provide generic companion-messaging transparency. Several routines and functions of the abstraction layer make transparency possible in that the applications are able to send messages back and forth without having to change their internal behavior for each external interface (e.g., platform-specific interfaces) device or application with which the applications communicate with. In embodiments, the abstraction layer includes system-side code, companion platform-side APIs, and base platform-side APIs routing messages during a generic companion-messaging session to provide companion experiences. The abstraction layer supports, among other things, an initialization process between the platforms, service discovery protocols, encryption, establishment notification, and user accounts authentication, in automatically and simultaneously pairing a plurality of companion platforms with a base platform.

Further, the communication between the base platform and the companion platform is based on a determined connection for the generic companion-messaging session. A direct or indirect connection may be used to route messages between the companion platform and the base platform. At a high level, a direct connection includes a local network connection (e.g., wired or wireless). If a companion platform cannot connect to a base platform using the direct connection, it may use an indirect connection (e.g. Internet-service connection). An indirect connection is a wide area network connection (e.g., ISP/3G/4G) that routes messages through the Internet via a service (e.g., TMF service). The connections may support different types of message delivery method (e.g., point-to-point or broadcast message) over different transports (e.g., TCP or UDP). As discussed the messages are routed to support underlying communication functionality to enable companion experiences; a companion experience allows the user to interact with content playing on the primary base platform, or supplemental content related to the media content, through the companion platform.

Figure 3:
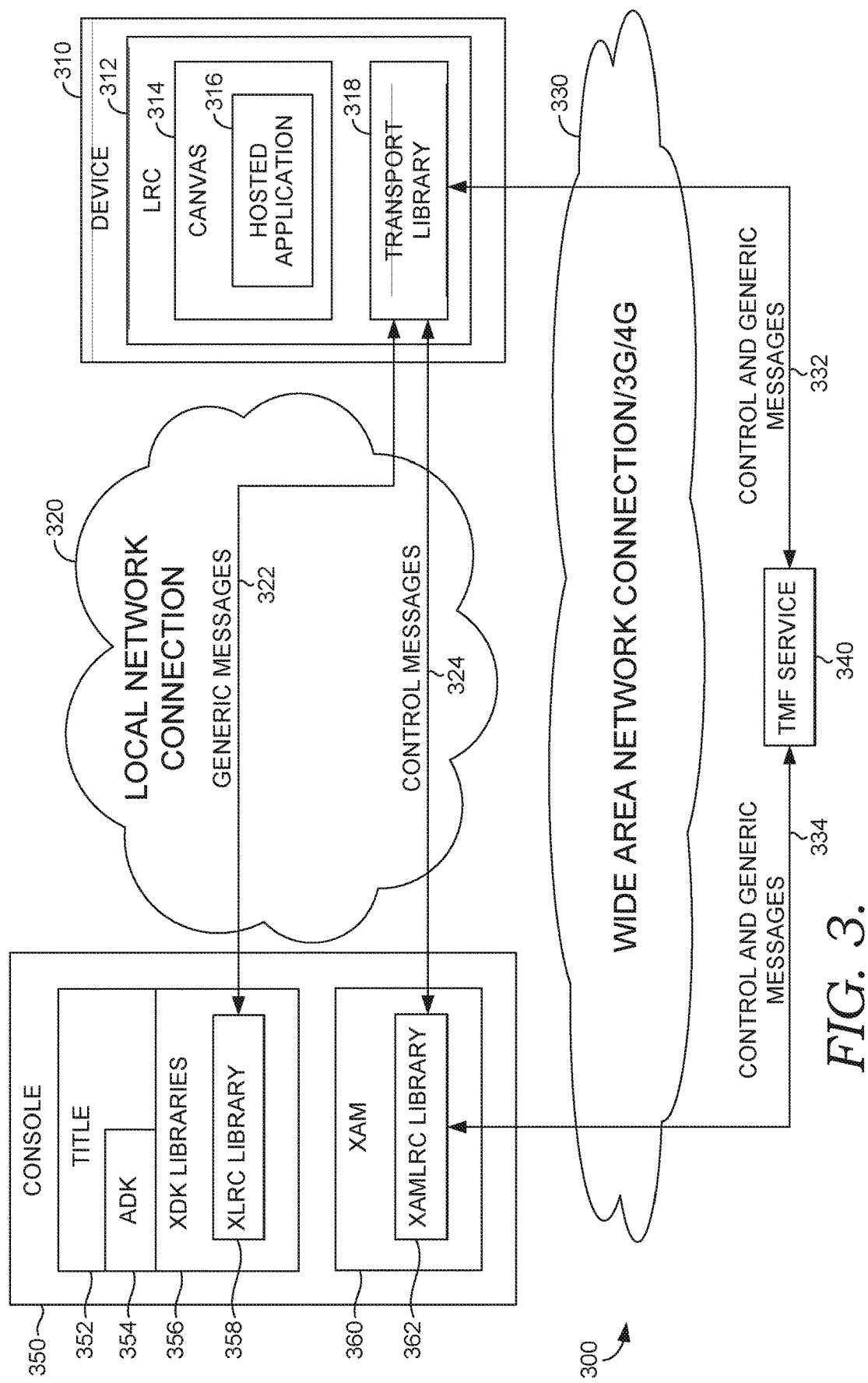
FIG. 3 is a diagram of a computing system architecture for generic messaging between a game console and a companion device, in accordance with an embodiment of the present invention.

Turning now to FIG. 3, an exemplary diagram 300 is illustrated for generic companion-messaging between a device 310 and a console 350, in accordance with an embodiment of the present invention. Although illustrated and described as a device 310 and a console 350 in a XBOX environment, this is only one example of a suitable environment for generic companion-messaging and is not intended to suggest any limitation as to scope of use or functionality of the invention. Neither should the invention be interpreted as having any dependency or requirement relating to any one or combination of components illustrated in the exemplary device 310 or console 350. Accordingly, the device 310 and the console 350 may be any type of device having computing capability in accordance with embodiments of the present invention.

The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX® provided by Microsoft Corporation of Redmond, Wash.) developer toolkit ("XDK') title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 provide an encrypted, communication channel between a title running on the console 350 and the LRC hosted application 316. The LRC 312 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneous connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used when the added reliability of TCP is not required. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network 320 or TMF service 340 via the wide area network 330. The TMF sends control and generic messages 332 and 334 between the device 310 and the console 350. Generic messages can include other title specific messages (e.g., touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 may be made aware of a connection when the device 310 successfully connects and then sends a title message session initialization message (e.g., XLRC_MESSAGE_CONNECT). It is contemplated within embodiments of the present invention that the console 350 may not be aware of the connection (e.g., local network connection or wide area connection) between the console 350 and the device 310 and automatically communicates messages over one or more connections associated with the console. In this regard, the console communicates a message and upon communication of the message, the message it routed based on an active connection between the console 350 and one or more devices 310 with a connection. Similarly, a hosted application 316 on a device 310 may also communicate a message to a console 350 and subsequent to said communication, a determination is made for an active connection (e.g., local area network, wide area network) between the device 310 and console 350 on how to route the message to the console 350. Overall, communicating messages to all active connections or prior to determining the active connection facilitates additional abstraction (e.g., transparency) and allows the device to switch between available connections in order to receive messages. Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport may be TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this may involve sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint, the device 310 is completely un-trusted when communicating with the console 350. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC_SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session, it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In an effort to mitigate some of the risk in having un-trusted, opaque data consumed by titles or hosted applications the contents of messages are accessible through a set of hardened function calls. The JSON protocol may be used for all generic message data. On the console 350, this may be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Figure 4:
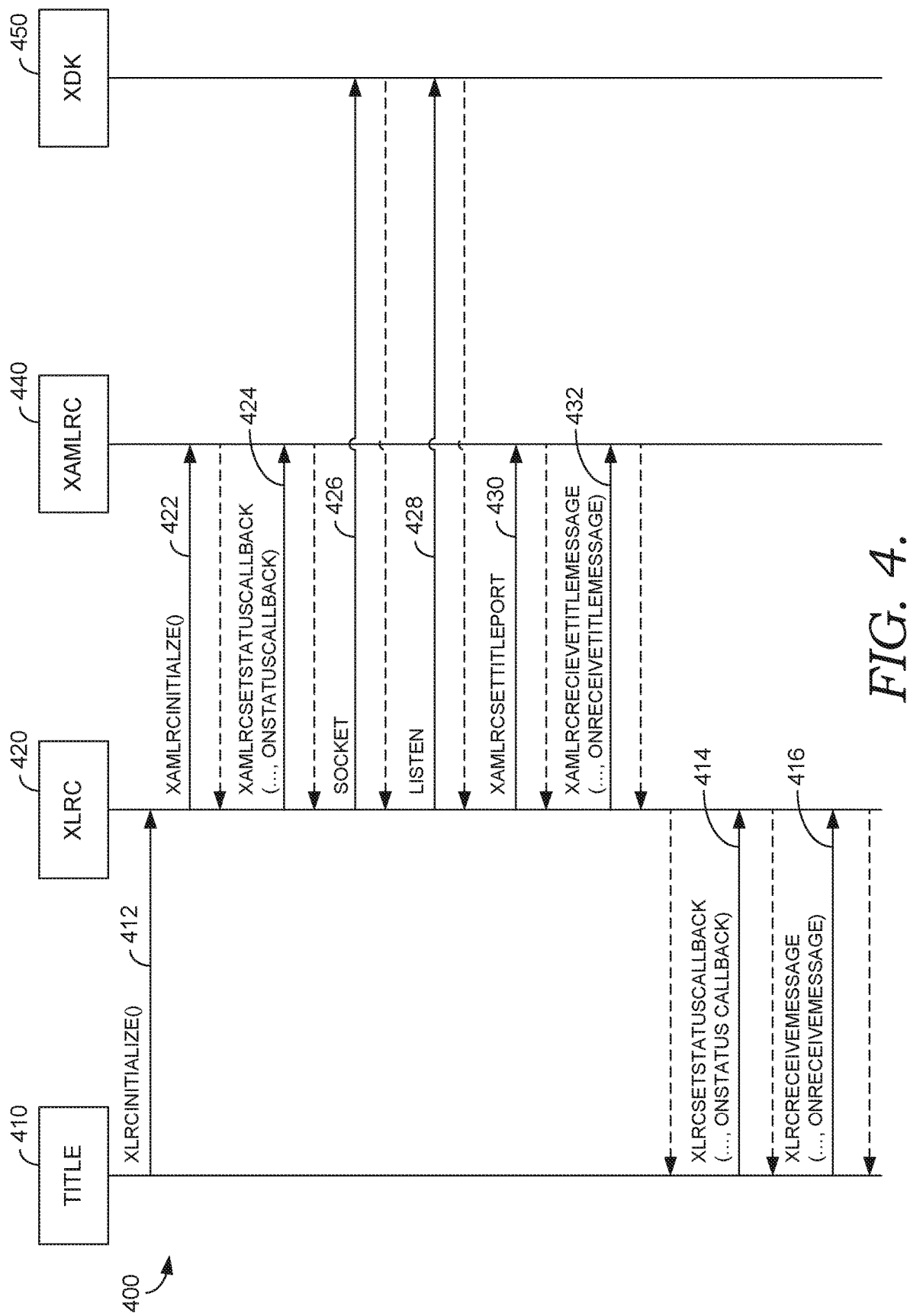
FIG. 4 is a sequence diagram depicting an exemplary initiation of a generic messaging session by a title, in accordance with an embodiment of the present invention.

FIG. 4 is a sequence diagram 400 depicting an exemplary initiation of a generic companion-messaging session by a title 410. Embodiments of the invention are not limited to names used with these message types. The title 410 initializes 412 XLrc 420 by calling XLrcInitialize. XLrc 420 initializes 422 XamLrc 440 by calling XamLrcInitialize and passes 442 a status callback function to receive 424 status change notifications. XLrc 420 creates 426 a TCP socket and puts it in listening mode 428. XLrc 420 passes 430 the listening socket's port number to XamLrc 440 by calling XamLrcSetTitlePort. This enables client devices to retrieve this information by sending a TMF command (e.g., LRC_MESSAGE_GET_ACTIVE_TITLE_INFO). XLrc 420 also calls 432 XamLrcReceiveTitleMessage to enable receiving messages from TMF. Next, the title calls 414 XLrcSetStatusCallback passing a status callback function to receive status change notifications (client connect/disconnect, media change, etc.). Finally, the title calls 416 XLrcReceiveMessage to enable receiving messages over the local network connection and from TMF.

Figure 5:
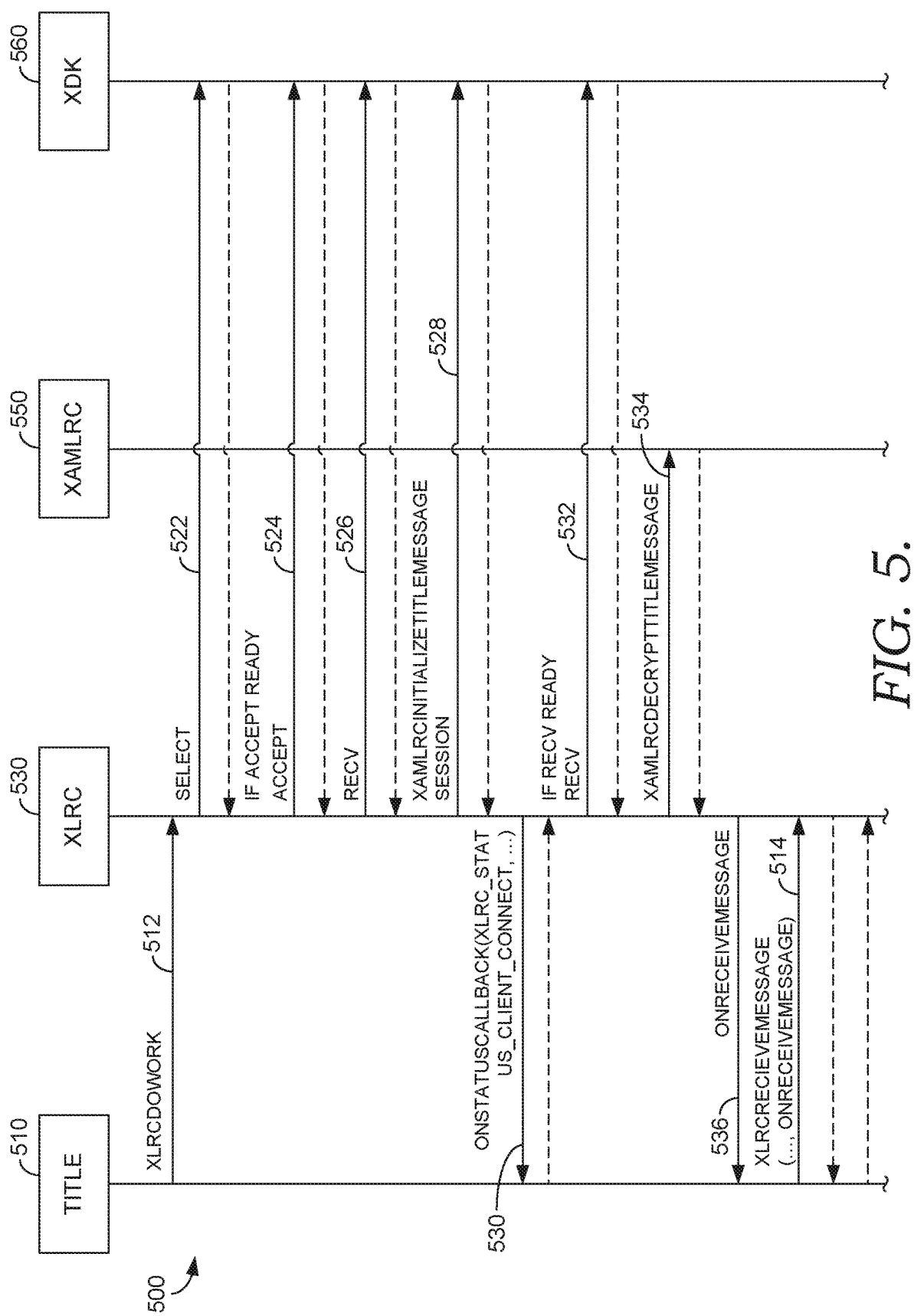
FIG. 5 is a sequence diagram depicting an exemplary run loop, in accordance with an embodiment of the present invention.
Figure 5:
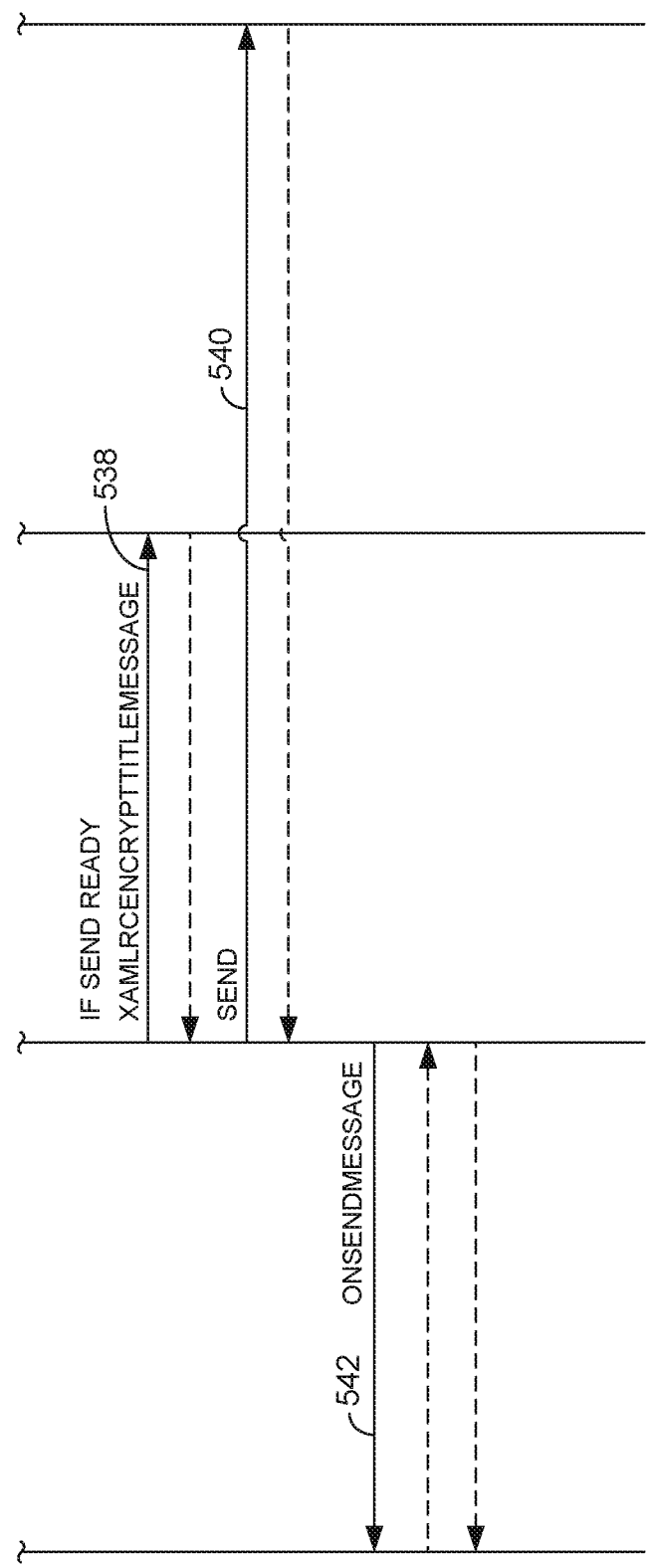

FIG. 5 is a sequence diagram 500 depicting an exemplary run loop. Title 510 calls 512 XLrcDoWork as often as possible. Typically, this will be done as part of the run (game) loop. XLrcDoWork will test the TCP listener socket to see if any device is attempting to connect. When a device is connecting 522, 524, and 526 XLrcDoWork accepts the request (subject to a maximum title message sessions in some embodiments) and then receives an incoming XLRC_MESSAGE_CONNECT message. Though shown below as a series of sequential operations the actual flow may be asynchronous and deal with timeouts and errors. Having received the XLRC_MESSAGE_CONNECT message, a title message session is established 528 in the XamLrc 550 by calling XamLrcInitializeTitleMessageSession. If the message is invalid, then XLrc will close the socket. If the message is valid and the session is initialized, then a status callback (e.g., XLRC_STATUS_CLIENT_CONNECT) indicating 530 a new client has connected is invoked.

When a title has clients that have connected to it over the local network connection XLrcDoWork will also test these open TCP sockets to see when recv and send can be called. When a socket is ready for a recv 532 and a previous XLrcReceiveMessage call hasn't been completed, XLrcDoWork calls recv followed 534 and 536 by XamLrcDecryptTitleMessage before calling 514 the callback specified in the XLrcReceiveMesssage call. When a socket is ready for a send call and a previous XLrcSendMessage call hasn't been completed, XLrcDoWork calls 538 XamLrcEncryptTitleMessage (could be done when XLrcSendMessage was invoked) followed by send 540 before calling 542 the callback specified in the XLrcSendMessage call. As shown, whenever a title receives a message it may immediately call XLrcReceiveMessage to ensure messages continue to be processed in a timely manner.

Figure 6:
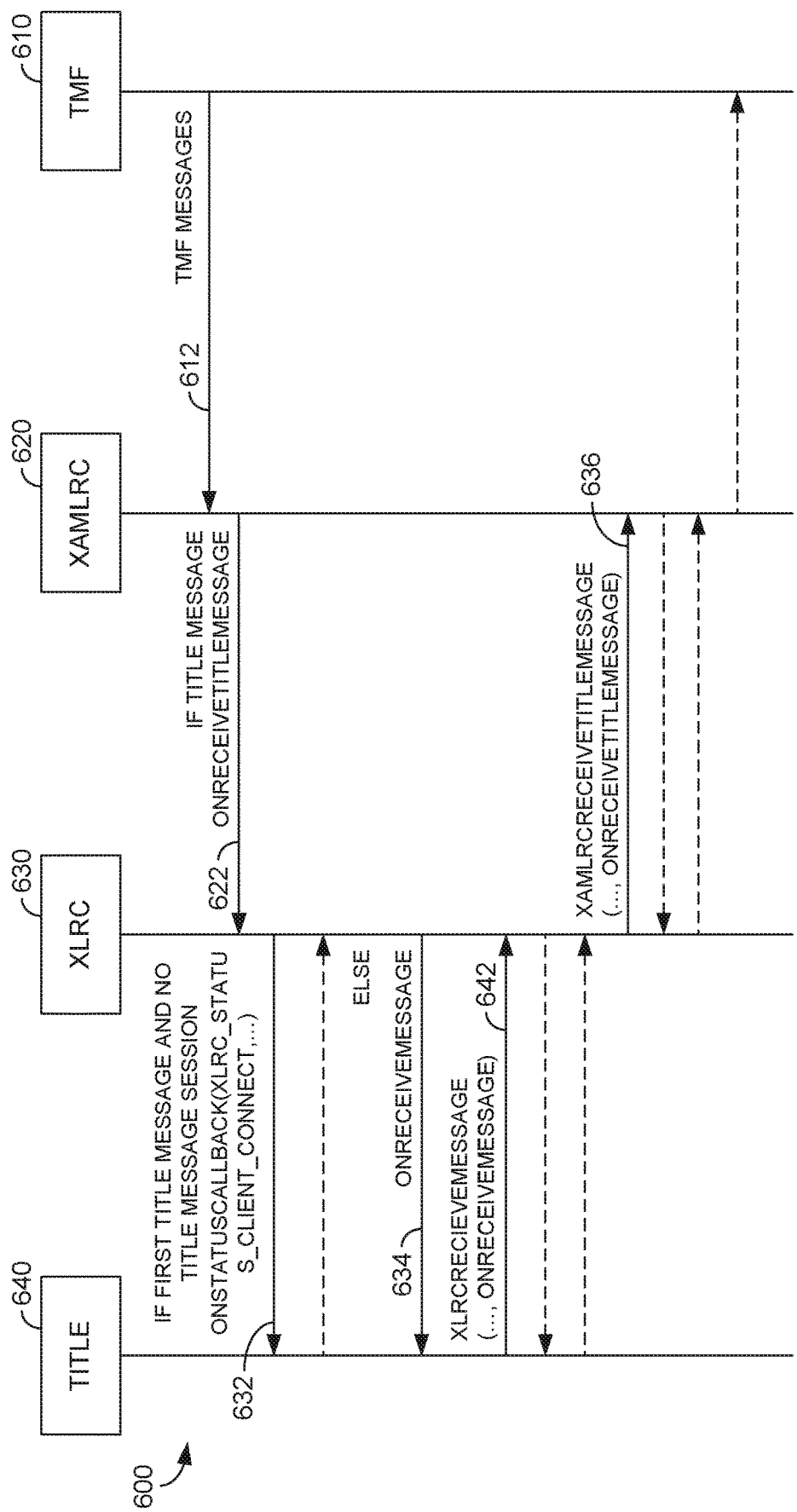
FIG. 6 is a sequence diagram depicting a title receiving messages over time, in accordance with an embodiment of the present invention.

FIG. 6 depicts a sequence diagram 600 depicting a title receiving messages over TMF service. Generic messages routed 612 through TMF 610 are delivered up through XamLrc 620. When it receives 622 a generic message and a previous XamLrcReceiveTitleMessage call hasn't been completed, XamLrc invokes 632 the callback specified in the XamLrcReceiveTitleMessage call. Messages routed through TMF are not encrypted so no additional processing is required. If the callback is invoked inside of XLrc (e.g. OnReceiveTitleMessage below), the sender of the message doesn't yet have a title message session, one is created and the status callback specified when XLrcInitialize was called is invoked with the XLRC_STATUS_CLIENT_CONNECT message. If, instead, the sender of the message already has a title message session 634, then XLrc 630 will either cache the message or if a previous XLrcReceiveMessage call hasn't been complete, XLrc 630 invokes the callback specified in the XLrcReceiveMessage call. Again, when a call to XLrcReceiveMessage is completed, the title 640 may immediately call 642 XLrcReceiveMessage to ensure messages are processed 636 via the XLrc 630 and XamLrc 620 as quickly as possible.

Figure 7:
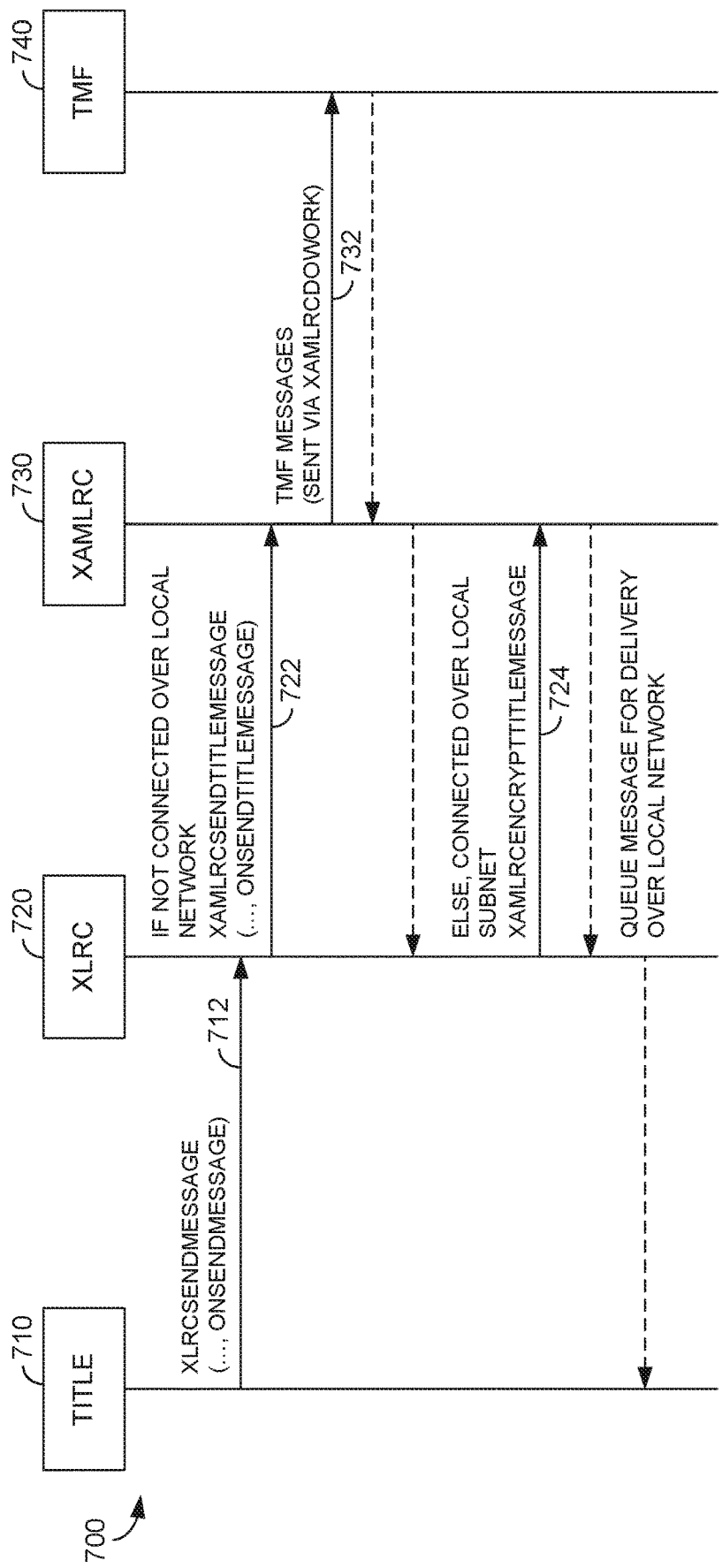
FIG. 7 is a sequence diagram depicting a title sending messages to a companion application, in accordance with an embodiment of the present invention.

FIG. 7 depicts a sequence diagram 700 illustrating a title 710 sending 712 messages to a host application. Titles send messages by calling XLrcSendMessage. If the title 710 is not connected over the local network connection to the device it is sending the message to the message will be routed 722 and 732 over TMF 740 by XLrc 720 calling XamLrcSendTitleMessage of XamLrc 730. A list of uncompleted XLrcSendMessage calls is kept, pairing them with their respective XamLrcSendTitleMessage calls, so that when the message is sent, completion can be signaled through the proper callback chain. When a message is sent and the title is connected over the local network connection to the device it is sending 722 the message to the message is queued to be sent when TCP socket is available for send. See FIG. 5 for more details.

Figure 8:
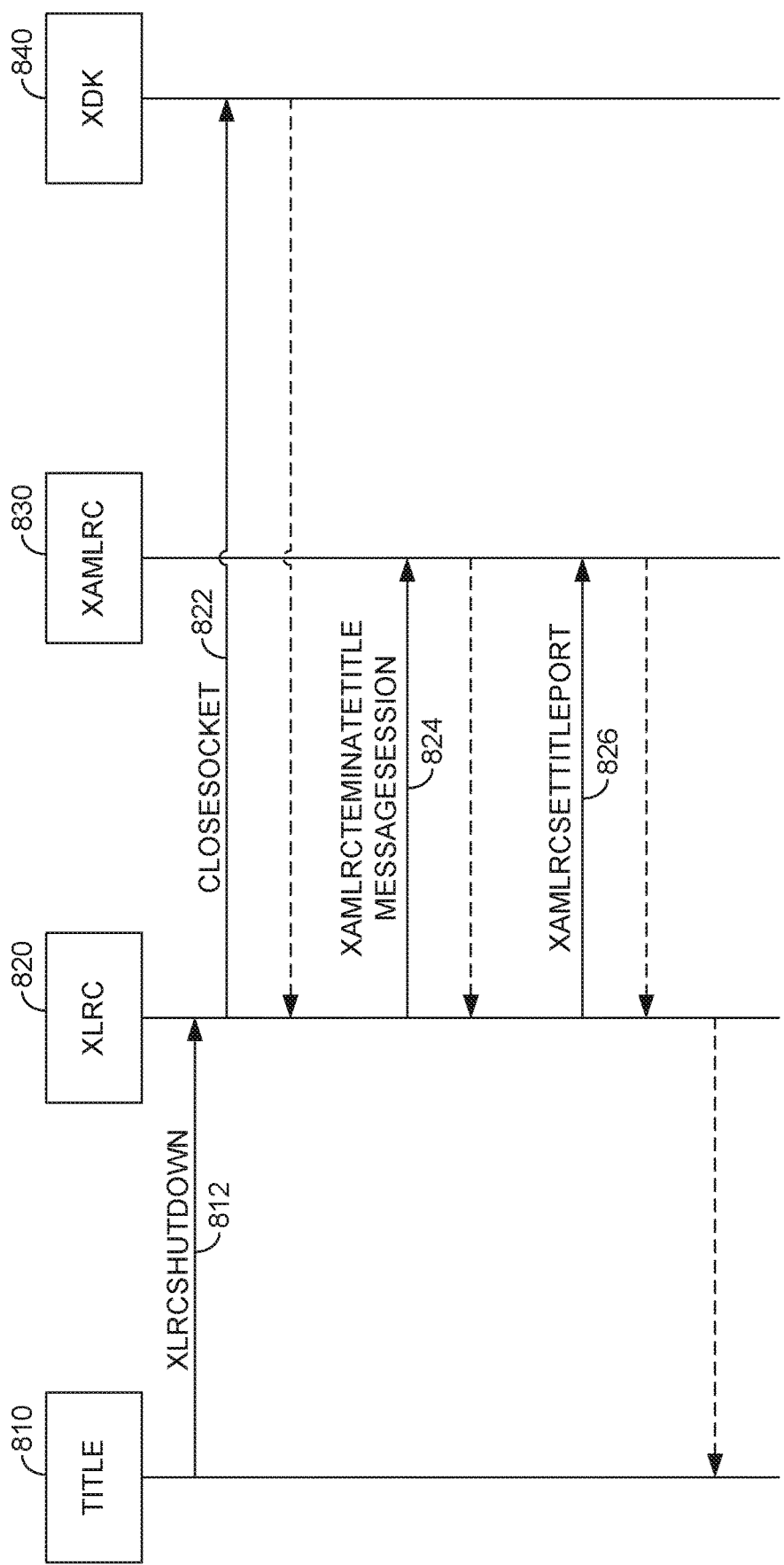
FIG. 8 is a sequence diagram depicting title termination, in accordance with an embodiment of the present invention.

FIG. 8 depicts a sequence diagram 800 illustrating title termination with title 810, XLrc 820, XamLrc 830 and XDK 840. When a title 810 is terminating it calls 812 XLrcShutdown to cleanup. XLrc 820 first closes 822 all open sockets, the TCP listener and title message session sockets. Then, it calls 824 XamLrcTerminateTitleMessageSession for each client that had established a title message session. Next, it calls 826 XamLrcSetTitlePort with a 0 for the listener port indicating that it is no longer listening.

Figure 9:
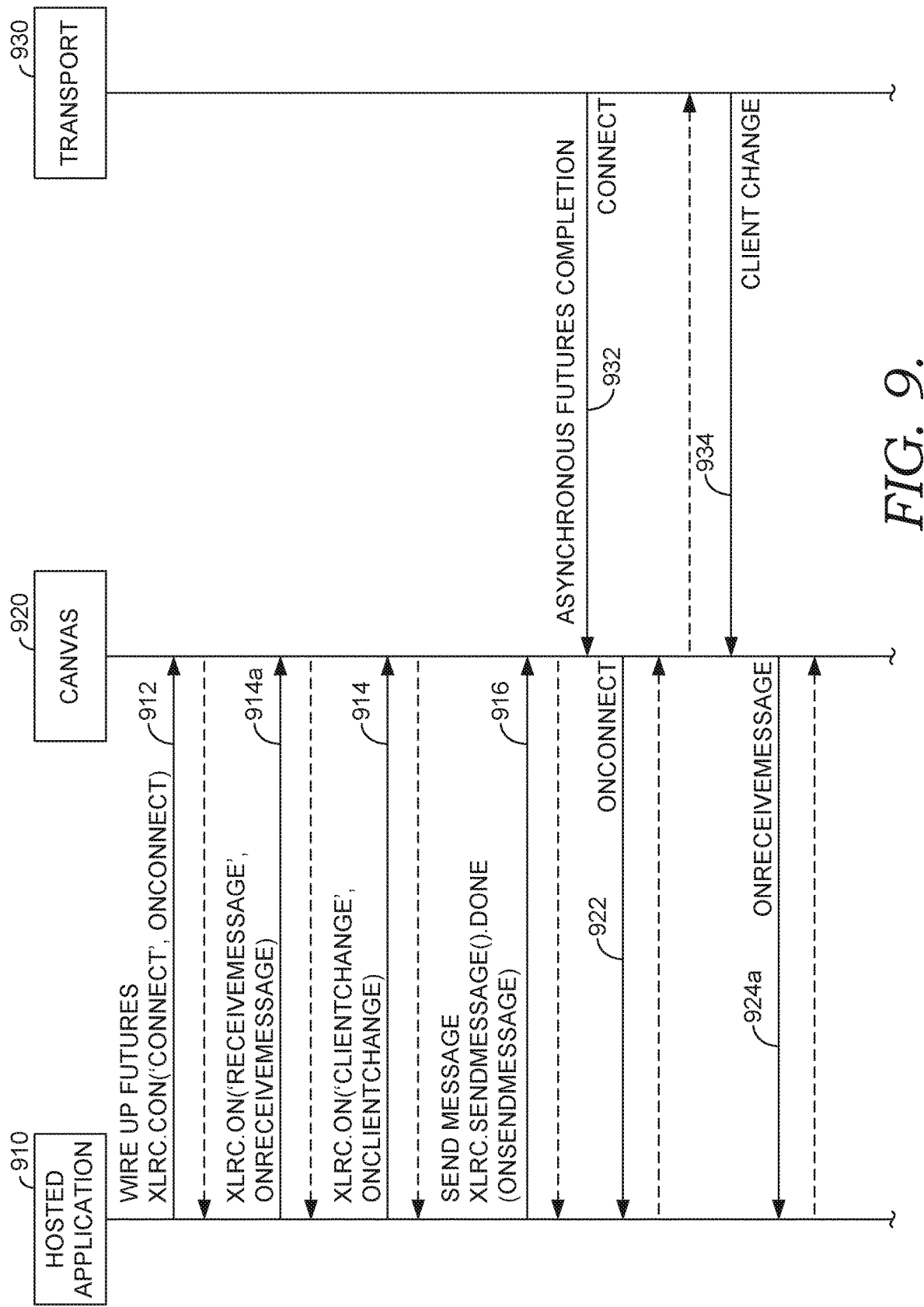
FIG. 9 is a sequence diagram depicting features wired up by a hosted application, in accordance with an embodiment of the present invention.
Figure 9:
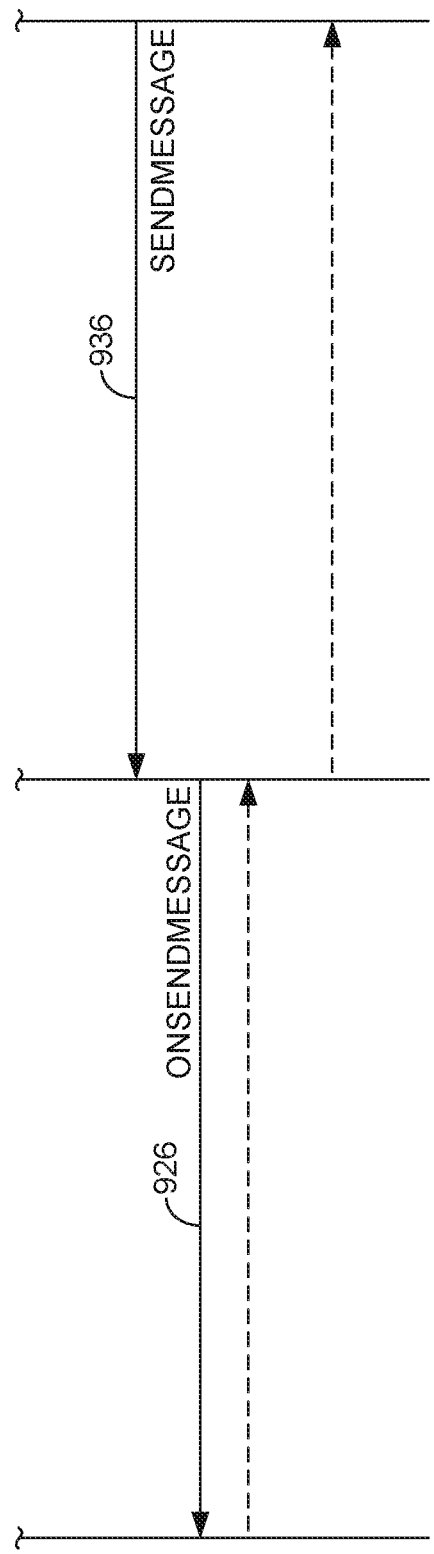

FIG. 9 depicts a sequence diagram 900 illustrating features wired up by a hosted application 910 with canvas 920 and transport 930. When a hosted application 910 is ready, it will wire up various features to handle asynchronous events: connect 912, 922, 932, receiveMessage 914a, 924a, and clientChange 914, 934. During normal operation an application may send the currently running title a message by calling 916, 926, 936 sendMessage. When any of the asynchronous events occur, including sendMessage completing, the corresponding done method is called, or in the case of failure the fail method is called.

Developers may wish to test the generic companion-messaging system as part of application development. A tool for testing generic companion-messaging between titles and hosted applications and vice versa is provided by embodiments of the invention. The tool allows testing of title applications and hosted applications in isolation from each other. This enables troubleshooting communications. The tool supports evaluation of sending and receiving messages on alternate device platforms.

Both the device and the console may be aware of the transport they employ for communication with one another. The transport library of the device attempts to establish a connection and therefore knows if it was successful. The console may be made aware of a connection when the device successfully connects and then sends a title message session initialization message (e.g., LRC_MESSAGE_TITLE MESSAGE_SESSION_INIT). Regardless, of the transport, the device always sends this message to initialize the title message session. Additionally, both the title and the hosted companion application can determine each device's transport when receiving information about each client. An event will be fired whenever a companion client connects or disconnects from a session. An enumeration of all clients currently in the session can be obtained, along with whether the client is connected over local network connection or over the cloud.

HTML5 hosted applications can be developed using a JavaScript library that is available as part of a hosted companion application SDK. The library provides APIs for getting notification about connection state changes, sending and receiving messages, and access to various device sensors. The JavaScript library exposes methods for both receiving title messages from the console as well as sending title messages to the console. An event may be fired whenever a companion client connects or disconnects from a session. This can be used to track the number of currently connected devices in a session. The JavaScript library exposes methods for the hosted companion application to connect or disconnect from the title message session.

The companion experience includes a plurality of APIs that expose raw touch as well as interpreted gestures. The APIs or events may be stored in the JavaScript library. Example touch/gestures supported by embodiments of the invention include Tap, Double Tap, Hold, Drag Start, Drag Delta, Drag Complete, Pinch Start, Pinch Delta, Pinch Completed and Flick. With the tap, a user briefly touches a single point on the screen. With the double tap, the user taps the screen twice in quick succession. This may be preceded by a tap gesture. If the time between taps is too great to be considered a double tap, two tap gestures will be generated instead.

With the hold, the user touched a single point on the screen for approximately a threshold period of time, such as one second. This is a single event, and not continuously generated while the user is holding the touchpoint. With the drag started event, the user touches the screen and initiates a drag gesture. The drag delta is an event that fires at regular intervals while the user is performing a drag gesture. The drag completed is activated when the user completes a drag operation.

For the pinch started, the user touched the screen and initiates a pinch gesture. For the pinch delta, an event that fires at regular intervals while the user is performing a pinch gesture. The pinch completed event is activated when a pinch is completed. The flick event is activated when the user performs a touch combined with a quick swipe of the screen.

Methods and events are provided for gathering data from the following sensors (depending on availability in the underlying hardware): accelerometer, gyroscope, GPS/Location, compass, proximity sensor, light sensor, vibration, and Hard/Soft Buttons.

Media Aware Companion Interface

The media-aware interface for a companion device makes it easier for a user to find relevant content for the companion device. The media-aware interface provides media control, a method to notify the user of events occurring in a hidden activity, providing an embedded application window, while also keeping the controls accessible to the user, and a system for surfacing activities that are relevant to the user. The media-aware interface may display social connections, such as people in the viewer's social network that have watched or are watching the program. Comments, such as the social posts, may also be displayed. The media-aware interface is generated by a companion application, running on the companion device and may communicate with a counterpart application running on a primary device. The media-aware interface creates a similar experience for users regardless of the companion device or platform they are using.

Embodiments of the present invention provide companion experiences that integrate with primary-content titles across multiple companion device platforms, including iOS, Windows Phone, Windows 8, and Android. Hosted companion applications, which may be written in HTML5, are applications running within the companion application. The companion application may run on a companion device or a primary device, such as a smart TV or game console.

An example of a hosted companion application enabled by the companion platform is a poker game. Imagine a scenario where a group is playing electronic poker on a game console. The poker title on the console can be extended to display an individual's poker hand on his companion device. The hosted companion application can use APIs provided by the companion application to implement features like "flicking" chips from the companion device to the console, and for sending information to the console via the messaging APIs to have those chips appear on the shared TV screen and have the corresponding bet placed.

Another example of a hosted companion application is an application (or possibly set of applications) to be used in conjunction with a sports network title on the primary device. When connected to the console, the application may allow for things like queuing up a set of highlights to watch or selecting favorite teams/sports to track. Even when not connected to the primary device, the application may allow the user to view her fantasy football stats, make player selections, trades, etc. by communicating directly with a set of cloud-based services that don't require communication directly with the primary device.

Figure 10:
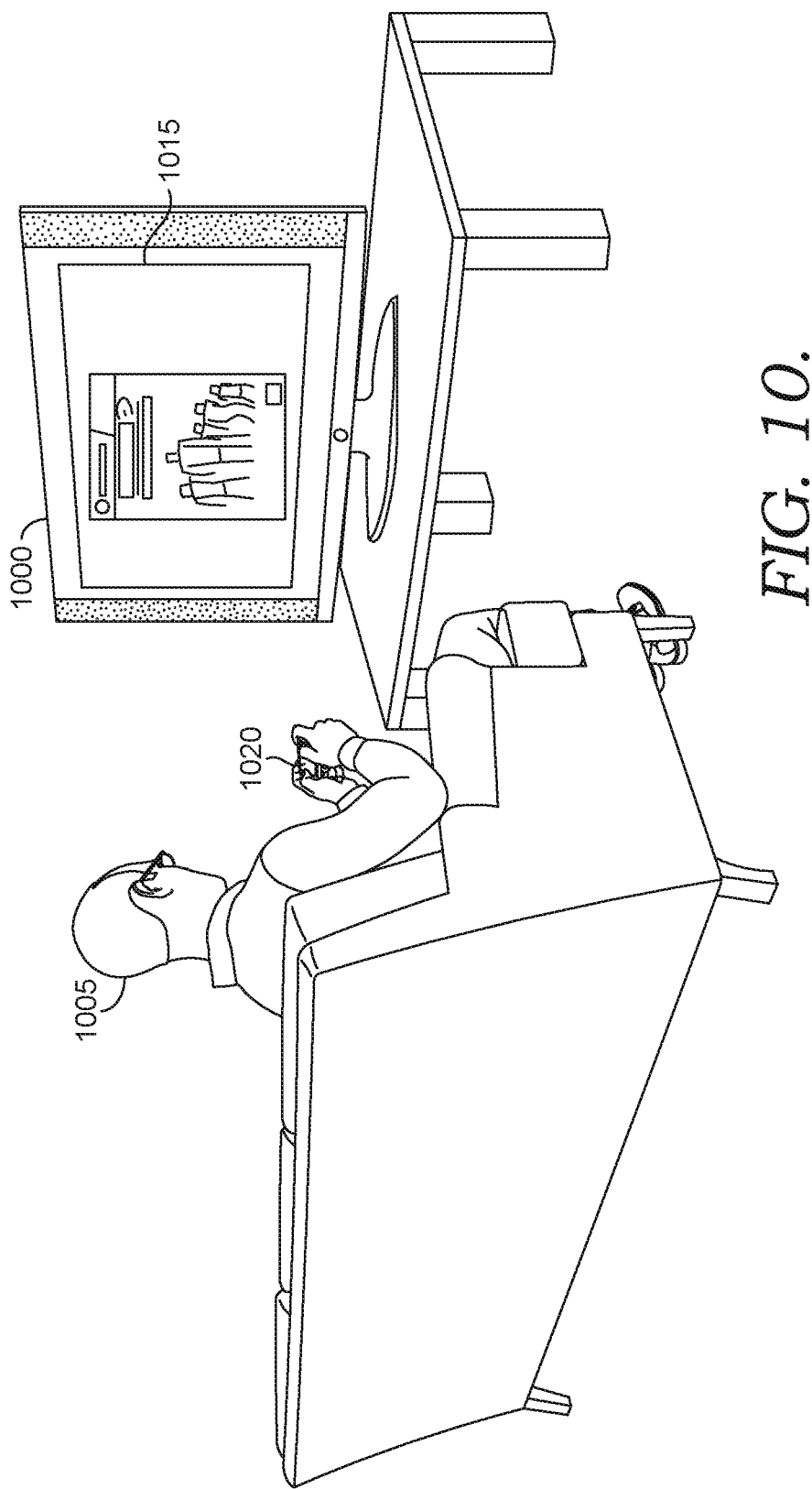
FIG. 10 is a diagram showing a person using a separate companion device to interact with primary content, in accordance with an embodiment of the present invention.
Figure 12:
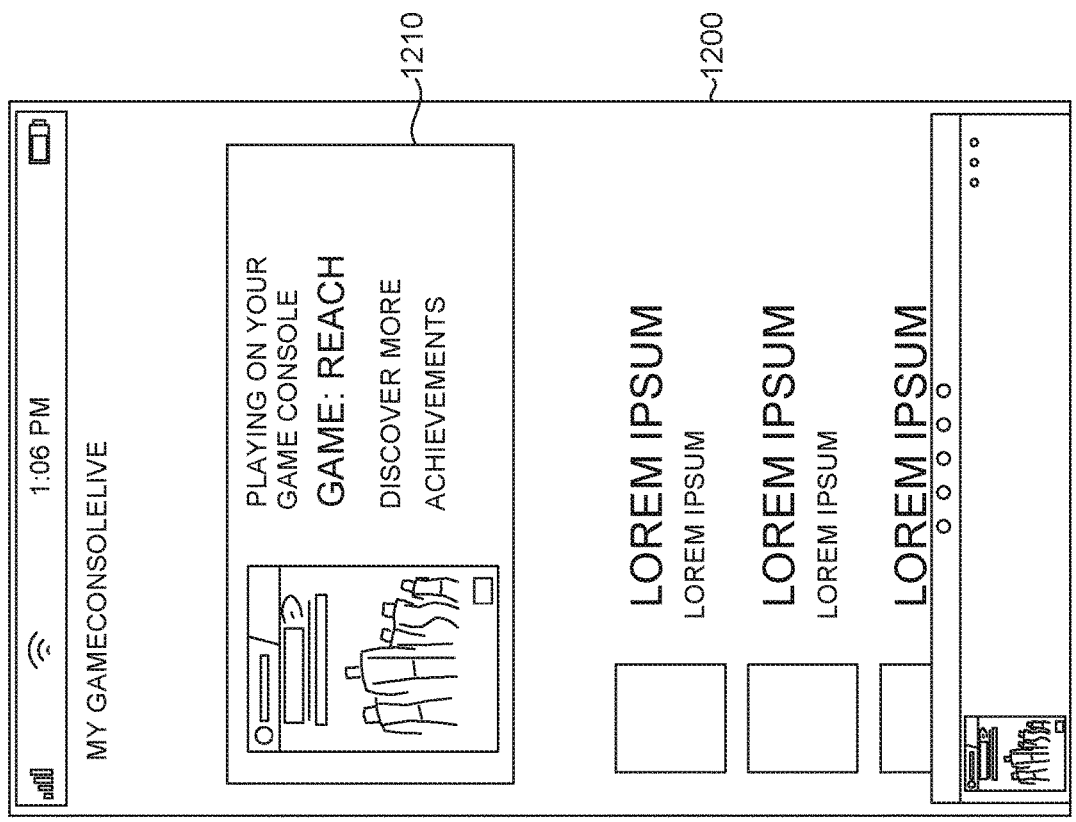
FIG. 12 is a diagram of a companion application home page that includes information about the active title on the primary device, in accordance with an embodiment of the present invention.

FIG. 10 depicts an embodiment for a media-aware interface shown on a separate companion device. As explained subsequently, a media-aware interface may also be shown on the same device displaying the primary content. FIG. 10 shows a user 1005 sitting on a couch interacting with an interface 1015 displayed on primary device 1000. Interface 1015 displays primary content, such as a movie, TV show, or game. The primary content may be generated by the primary device 1000 or by a media device, such as a game console (not shown). The user 1005 is holding a companion device 1020 (e.g., smartphone, tablet) that runs a media-aware companion application. The media-aware application receives information describing the title team shown on the primary device. The media-aware application uses the title information to find secondary content that is related to the primary content. The user may select secondary content through the media-aware application for display on the primary device or the companion device. In addition, the media-aware application may run secondary content applications. As mentioned, secondary content could be an application, web page, or other media content.

Figure 11:
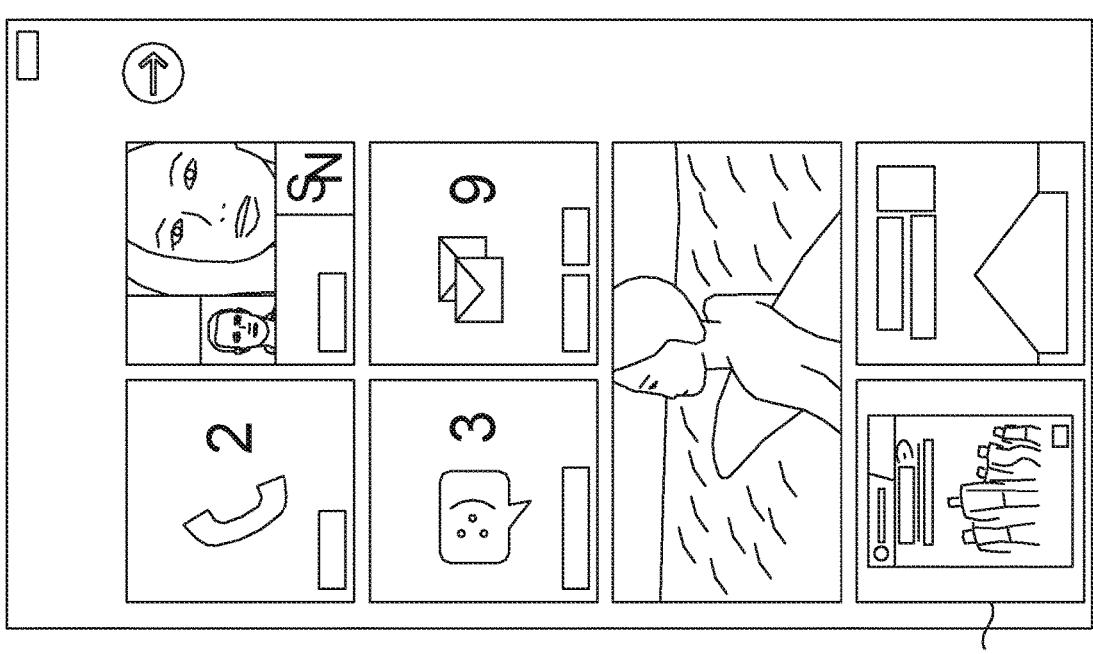
FIG. 11 is a diagram of an interface that includes a tile showing an active title on a primary device, in accordance with an embodiment of the present invention.

FIGS. 11-14 depict a companion experience that informs the user what title or titles are running on the user's game console, discovers relevant secondary content, and runs the secondary content within the companion application. In FIG. 11, an icon 1105 displayed on a smart-phone interface 1100 shows what title is currently active on the primary device. In some embodiments, multiple titles may be active. When multiple titles are active, an icon may be displayed for each title. In other embodiments, the title presently receiving user interaction or that received user interaction most recently is shown.

Clicking the icon 1105 will launch the companion application home page 1200, which displays the active tile 1210. If multiple titles are active, then multiple active tiles may be displayed within home page 1200. Clicking on the active tile 1210 in FIG. 12 will launch the welcome page 1300, shown in FIG. 13, for the active title. The welcome page 1300 for the primary content may be accessed from other locations as well.

Figure 14:
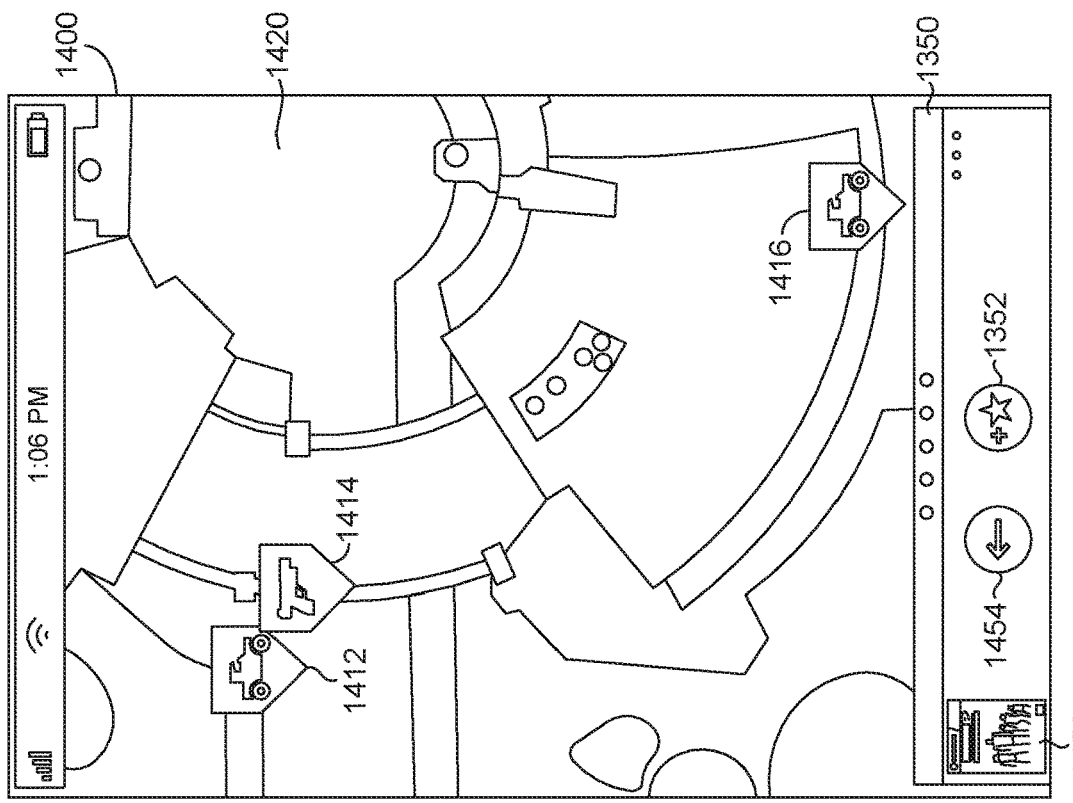
FIG. 14 is a diagram of an interface displayed on a companion device showing a detailed view of an activity related to a title playing on a game console, in accordance with an embodiment of the present invention.
Figure 13:
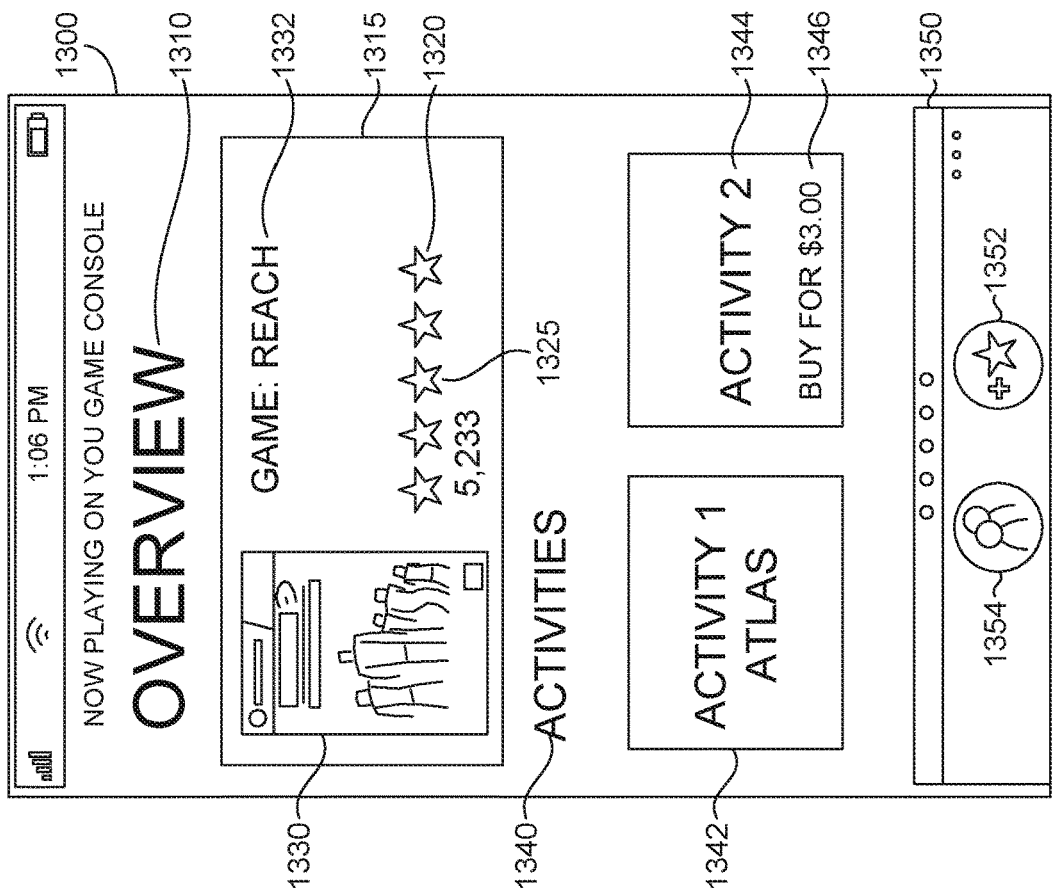
FIG. 13 is a diagram of a welcome page within a companion application for a title that displays available activities, in accordance with an embodiment of the present invention.

On the welcome page 1300, there is a list of activities 1340, or secondary content, that are available for the active title. Additionally, a primary content tile 1315 may provide additional details about the primary content. In this example, Activity 1 and Activity 2 are hosted companion applications. Selecting the Activity 1 tile 1342 will launch the "Atlas" application as shown in FIG. 14. Activity 2 may be activated by selecting Activity 2 tile 1344. Supplemental information 1346 is provided within the Activity 2 tile 1344 indicating that Activity 2 needs to be purchased for $3.00 prior to activation. Upon selecting Activity 2 tile 1344, the user may be taken to an application purchase interface from which the application may be purchased and downloaded (if needed). The purchase and download process can take many forms. In one embodiment, a confirmation box is displayed and the activity is purchased, downloaded, and opened in response to receiving confirmation.

The actions and activities displayed on the welcome page 1300 may vary depending on whether the primary content is currently playing or not. When the content is currently playing on a primary device to which the companion device is connected, the welcome page may show content art 1330, a content title 1332, a list of available activities 1340 for the content, access to additional information about the content, such as an overview 1310, and a suggestion for what to do next based on the current state of the content.

When the content is not currently playing on a primary device to which the companion device is connected, the welcome page may show content art 1330, the content title 1332, an overview 1310, and ratings for the content 1320. In addition, a list of available activities 1340 for the content, a play command, and a suggestion for what to do next based on the current state of the content may be displayed. The play command may give the user the choice of where to watch the content. For example, the user may be given the choice to push content to the primary device or watch on the companion device.

The companion application may discover and display several different types of activities that are related to the primary content. Example activities include: displaying the base info about the primary content (e.g., title, box art, description/synopsis); displaying additional details about a primary content (e.g., cast and crew, images, achievements); displaying related information about a primary content (e.g., reviews, news/gossip, social activity); displaying related content for primary content (e.g., a related but different game, a related but different movie); a mini-app experience that stands alone (e.g., Halo Waypoint™, ESPN Scores experience, content-specific shopping); interactive experiences that directly interact with the running primary content (e.g., Halo® Atlas, Madden Pick a Play, Dance Central/Lips Song catalog picker, ESPN remote); and a launch point for a native application related to the content (e.g., Fable Coin Golf, Kinectimals, Glee sing-along) that does not run within a hosted application window within the companion application.

In some cases an activity can fall into multiple categories. For example, Halo Waypoint™ and Halo® Atlas may be contained in one activity with its own internal navigation. The developer of the activity is responsible for appropriate behavior and messaging for which part of the application can be used when disconnected from the primary device and which part requires the primary content to be running and companion device to be connected to the primary device.

Activities can be created by the developers of a companion application (e.g., built-in base info), by developers of a game or media title being shipped as first party content, $2^{nd}/3^{rd}$ party partners or even other content consumers. There can be any number of activities for a given primary content.

Activities may range from built-in free experiences, to paid enhancements or experiences that require a paid membership provided by a gaming or media service. The interface indicates to the user those activities, which will require membership or additional payment. If a user who is not a member tries to access an unauthorized type of activity, the interface will explain why they are not allowed to access it, direct them to sign up for a membership, and allow them to immediately get to the sign-up experience.

Certain types of activities may be promoted specially to the user as they have unique or high value both to the user's experience and commercial value. These activities may be given a top spot among listed activities for a primary content. Paid Enhancements are any activity that requires a paid transaction to access. These activities represent high value to the business and may be prominently featured (aka "merchandised") to encourage users to acquire them. Native Apps that are listed as an activity are one example of paid activities and may be highlighted for the same reasons. Even when such apps are not paid directly, they may use a PDLC/freemium model for monetization and as such represent high value to the business.

Each activity will use a set of information to effectively communicate to the user what the activity is and will do, and attract the user to open that activity and the content it enhances. Further, the way activities are organized in the list will effectively highlight the most important ones, while effectively merchandising additional activities. In one embodiment, the title developer is able to designate a showcase activity that is shown at the top of the activity list with a larger associated tile or icon.

Elements to display with an activity may include: activity name; visual representation (i.e., tile/icon art); price (if applicable) so the user knows how much it will cost to use; membership required (if applicable); separate downloadable application indicator (if applicable) so the user knows that they are about to launch an experience outside the companion application and, thus, leave the companion experience; and recommended experience indicator (if applicable).

Embodiments of the invention may order activities in the list according to relevance. In one embodiment, recommended activities are prioritized. Next, two or three activities provided by the publisher of the primary content may be highlighted. Next, activities provided by the companion experience provider and finally, other activities. As described above, the recommended activity is specifically designed for the content and is optimized for the companion device, for example to take advantage of the touch screen capabilities. The recommended activity may be displayed more prominently. When a large number of applications are available, a link to additional activities may be provided on the interface.

Turning now to FIG. 14, the secondary content application "Atlas" is shown with an interface 1400. The Atlas application shows a map 1410 of the Halo® videogame. Various resources such as weapon 1414, vehicle 1412, and vehicle 1416 are shown. These may be interactive and the user may be able to learn more about these resources upon selecting them. In some cases, the game, which is the primary content in this illustration, may be manipulated in response to changes made on the map 1410. For example, resources could be added or removed.

In addition to the secondary content displayed, a navigation bar 1350 remains that allows the user to go back to the welcome page 1300 by selecting icon 1456. The navigation arrow 1454 can cause the user to navigate through the secondary companion application or within the companion application to access other functionality. The home button 1352 returns to the home page shown in FIG. 12. Other functionality is also possible within the navigation bar 1350. The navigation bar 1350 is contextual and buttons will be added or removed from the navigation bar 1350 depending on the state of the primary content and the active secondary content. For example, for a secondary content application related to a movie, movie controls could be included in the navigation bar 1350. Movie controls include stop, pause, fast forward, rewind. Different movie controls could be shown based on the play head status. For example, play could be shown when the movie is stopped or paused, but removed when the play head status is playing. Similarly, the pause or stop button could be removed when the play head status is stopped and play button is displayed in place of the stop or pause button.

Figure 15:
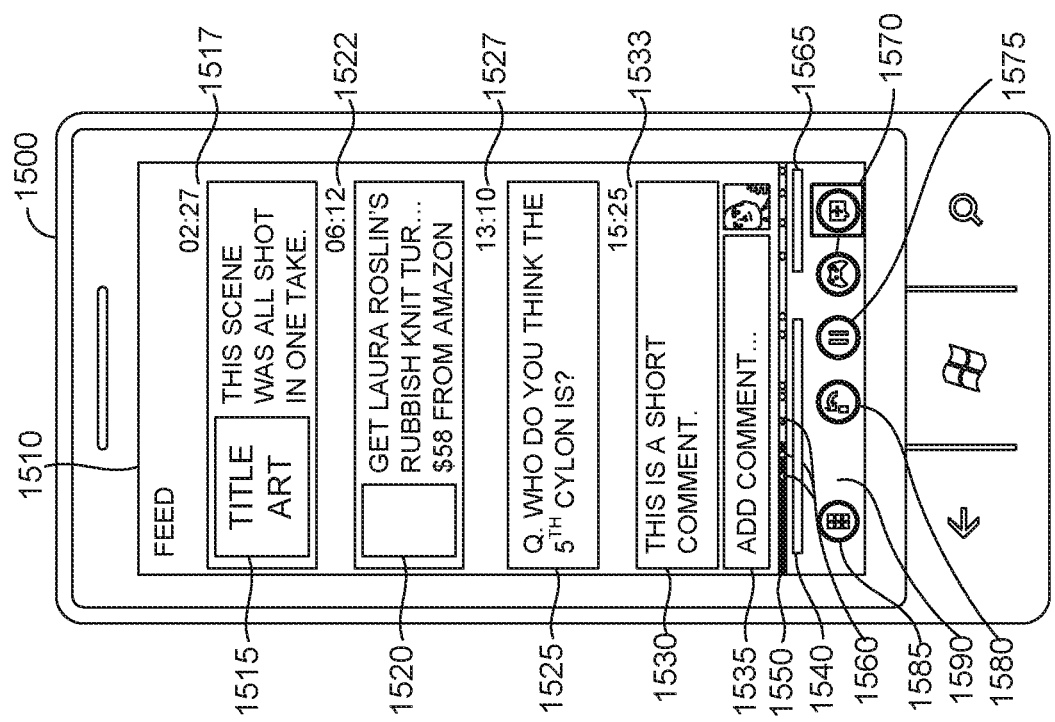
FIG. 15 is a diagram of an interface displayed on a companion device showing a timeline activity along with a navigation bar that controls the companion application and the primary device, in accordance with an embodiment of the present invention.

FIG. 15 shows a companion device 1500 displaying a feed 1510 comprising time-sequenced events. The events in the feed may be displayed in synchronization with a media playing on a separate device, like a game console. In other words, as the media presentation reaches a point associated with the time on the event then the event appears to the user in the feed. State information communicated to the companion application may be used to let the feed application synchronize the comments. Because the events are time coded to the media content, they can be prepared in advance and only presented once the media begins playing. Other events may occur in real time as they are generated. For example, a friend's comments may appear in nearly real time as they are published if the content is live. In one embodiment, the feed maybe scrolled. Each item or event within the feed is associated with a time within the media. In this case, the media is Battlestar Galactica, Season 1, Episode 4. In one embodiment, the interface allows the user to skip to place in the content associated with the comment. For example, a "skip to" button may be provided or the user could click on the time displayed within or adjacent to the comment. The content is "skipped" by moving the playhead to the point in the content associated with the time in the comment.

The first feed item is a commentary event 1515. The director's commentary is associated with the time code 1517. The director's commentary provides additional information about a scene occurring near the time code. The user may specifically subscribe to an application that pushes director's information to the feed. By selecting the commentary event 1515, the user may be shown additional commentary details, if any are available. In one embodiment, the user is taken to a new screen to be shown the commentary details. Comments, commentary, polls, and ads can all be any combination of images and formatted text.

The next feed item is a contextual advertisement 1520 that relates to the media. The advertisement is associated with time code 1522.

The next feed item is a poll question 1525 asking, "Who do you think the Fifth Cylon is?" Users are able to respond to the poll question by selecting it, which could open a poll response interface. The response interface allows the user to select a poll answer. The current poll results may be shown in response to the selection. In one embodiment, only answers from a user's friends are shown.

The poll question and other activities may be generated through a special creator interface. In one embodiment, the creator interface is accessed by a developer that associates activities with the media content within the companion experience ecosystem. In this case, the activities may be accessed by all users of the application. In one embodiment, the activity may be accessed by all users, but answers are only shared with the user's social network. For example, the answer to poll questions may be shared only with a user's connections in one or more social networks. Friends within a gaming community are one example of a social network.

In another embodiment, anyone may use the creator interface to create activities and events that may be published to the world or to just friends.

The final feed item is a short comment 1530. The feed could also include comments of any length. A short comment fits on a single line. Longer comments may include ellipses to indicate more of the comment may be accessed by selecting the comment. Other indications, such as a drop down arrow could be included with longer comments. The comment, poll question, and other feed items may be drawn from those published by friends within the user's social network. The comments may also be from a subset of friends, for example, a group of friends that are fans of a TV show.

In addition to viewing the items, the user could create a feed item by entering text into the comment box 1535 and posting the comment. The feed interface includes a description of the media or content associated with the feed. In this case, the feed is associated with an episode of Battlestar Galactica, which is shown on a different display device that is synchronized with the companion device 1500. For example, the user could be watching Battlestar Galactica through a title playing on their game console while simultaneously viewing the feed on their companion device 1500. Progress bar 1550 and time counter 1565 show the progress of the media being played on a separate device. The dots 1560 within the progress bar 1550 each correspond to a feed item available to the user. Dots are added as additional events, or feed items are added by the user or companion device 1500 or other users. In one embodiment, the event associated with the dot is shown when the dot is selected. For example, the user could select a dot and be shown an associated comment.

Selecting the control icon 1570 activates several web media functions that allow the user to control the media playing on the primary device using the companion device. Upon selection of the control icon 1570, a control user interface that allows the user to interact with the content displayed by the game console is presented. The control interface may include a gesture area where the user can make touchpad gestures that manipulate content playing on the game console.

Selecting the pause button 1575 will pause the media presentation. Selecting the rewind button 1580 will rewind the media. In one embodiment, the rewind button causes a skip back. For example, the media could skip back eight seconds each time the rewind button 1580 is pushed. Selecting button 1585 will return the application to a home page or welcome activities page.

The contextual advertisement 1520 is illustrated. The contextual advertisement is for a product shown within the media content. In the example shown, the advertisement is for a sweater worn by Laura Roslin, a character in Battlestar Galactica. The time code 1522 causes the advertisement to be shown at 6:12 of the media presentation. Though not required, the time synchronization may correspond with when the product appears in the media content. The user may open an interface to receive more information about the product and even purchase the product by selecting the contextual advertisement 1520. Selecting the advertisement may take the user to an online store or open a shopping application.

The contextual advertisement 1520 may be generated by an advertising service associated with the feed application. The user may opt-in to receive the contextual advertisements.

Other feed items that are not shown include an activity item that allows the user to complete an associated activity, like a game. The feed items could be linked to a URL that is displayed in a rendering space generated by a companion application upon selection of the feed items. The feed item could link to a list of activities for the title. In other words, the feed could be used as a discovery mechanism for additional secondary content.

Figure 16:
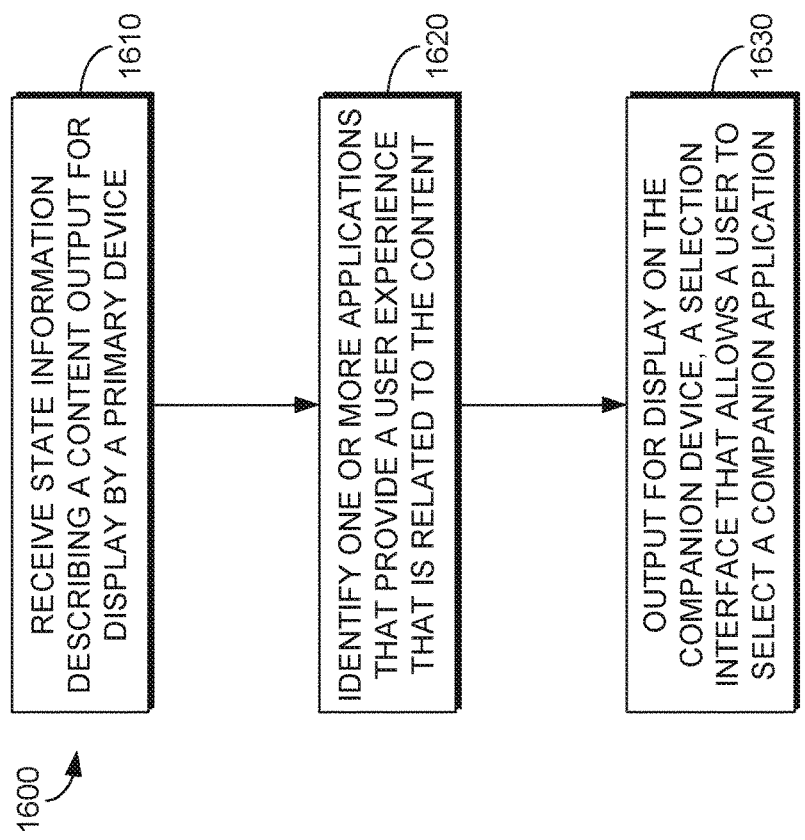
FIG. 16 is a flow chart showing a method of generating a companion experience on a companion device, in accordance with an embodiment of the present invention.

Turning now to FIG. 16, a method 1600 of providing a companion experience is shown, in accordance with an embodiment of the present invention. Method 1600 may be performed on a companion device, such as a smartphone or tablet. Method 1600 may be performed by a host application running on the companion device. At step 1610, the companion device receives state information describing a primary content output for display by a primary device. As mentioned, the primary content may be a movie, music, game, or other similar content. The primary content may be output for display on a television or other display device. The primary device could be the television, but it could also be a game console, media player, cable box, or other similar device capable of outputting a rendered video image or audio content.

The state information describes the primary content as well as the present state of the primary content. The state information may describe the primary content by identifying it according to its name, catalog number, or other mechanism through which the primary content may be uniquely identified. The state of the primary content may be indicated according to a progress point within the primary content. For a video, the progress point may indicate how far along the video presentation has progressed. For a game, the progress point may be a level, geographic point on a game map, or other information that allows game progress to be identified. Additionally, the play head state of a primary content may be indicated within the state information. The play head indicates whether the movie is playing, stopped, paused, being fast forwarded, being rewound, or is in some other presentation state. For a game, the play head state may indicate whether the game is paused or in some other transitional phase, such as loading a new level. The state information could also identify actors or characters appearing on screen, music playing, product placement, or other features of the primary content.

At step 1620, one or more applications that provide a companion experience that is related to the primary content is identified. The one or more applications may be identified using the identification information in state information. Identification information within the state information may be sent to an online catalog that is used to retrieve, and possibly rank, the one or more applications. The one or more applications may be described as companion applications, or secondary content applications.

In addition to identifying the primary content by title, the progress within the title and other trigger information may be used to identify or rank the one or more applications. For example, an application that is designed for a certain level of a game may only be returned upon determining that the progress of a game has progressed to the associated level. Other triggers, such as the need for help within a game may be used to select the one or more applications. In one embodiment, all applications related to a title may be returned and the trigger information may be used to rank the various companion applications in order of relevance to the user. In addition to returning companion applications, web pages that provide help information or other content may be linked or identified.

At step 1630, a selection interface is output for display on the companion device. The selection interface allows a user to select a companion application. As mentioned, the companion applications are related to the primary content. The selection interface may show the one or more applications, or a subset of the one or more applications identified at step 1620.

In one embodiment, the method includes receiving a selection of a companion application and opening the companion application within an application environment provided by the hosting application. The application environment may be a DirectX® environment that is able to stream video content received from another device within the application window. In another embodiment, the application environment within the host application is a rendering space that runs HTML applications. The application environment may include a series of APIs through which companion device resources may be accessed by the companion application.

Figure 17:
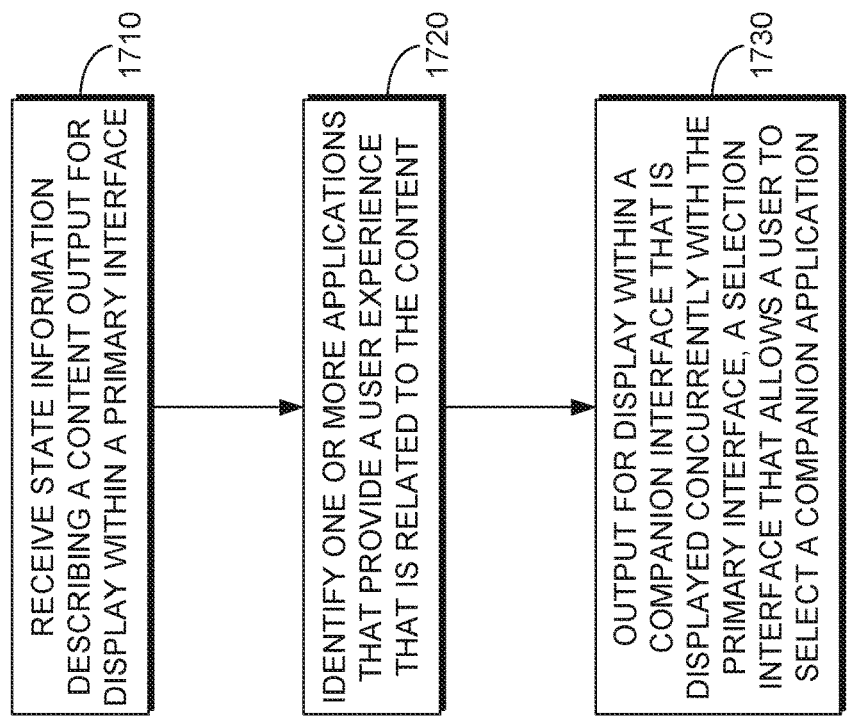
FIG. 17 is a flow chart showing a method of generating a companion experience, in accordance with an embodiment of the present invention.

Turning now to FIG. 17, a method 1700 of generating a companion experience is provided, in accordance with an embodiment of the present invention. Method 1700 may be performed on a companion device, such as a smartphone or tablet. At step 1710, state information is received that describes a primary content output for display within a primary interface. State information has been described previously.

At step 1720, one or more secondary applications that provide a companion experience related to the primary content are identified. The secondary applications may be identified by accessing a catalog that associates secondary applications with primary content. At step 1730, a selection interface that allows a user to select a companion application is output for display within a companion interface that is displayed concurrently with a primary base. The selection interface may be displayed on the same display device as the primary interface or on a second device, such as a smartphone or tablet.

Figure 18:
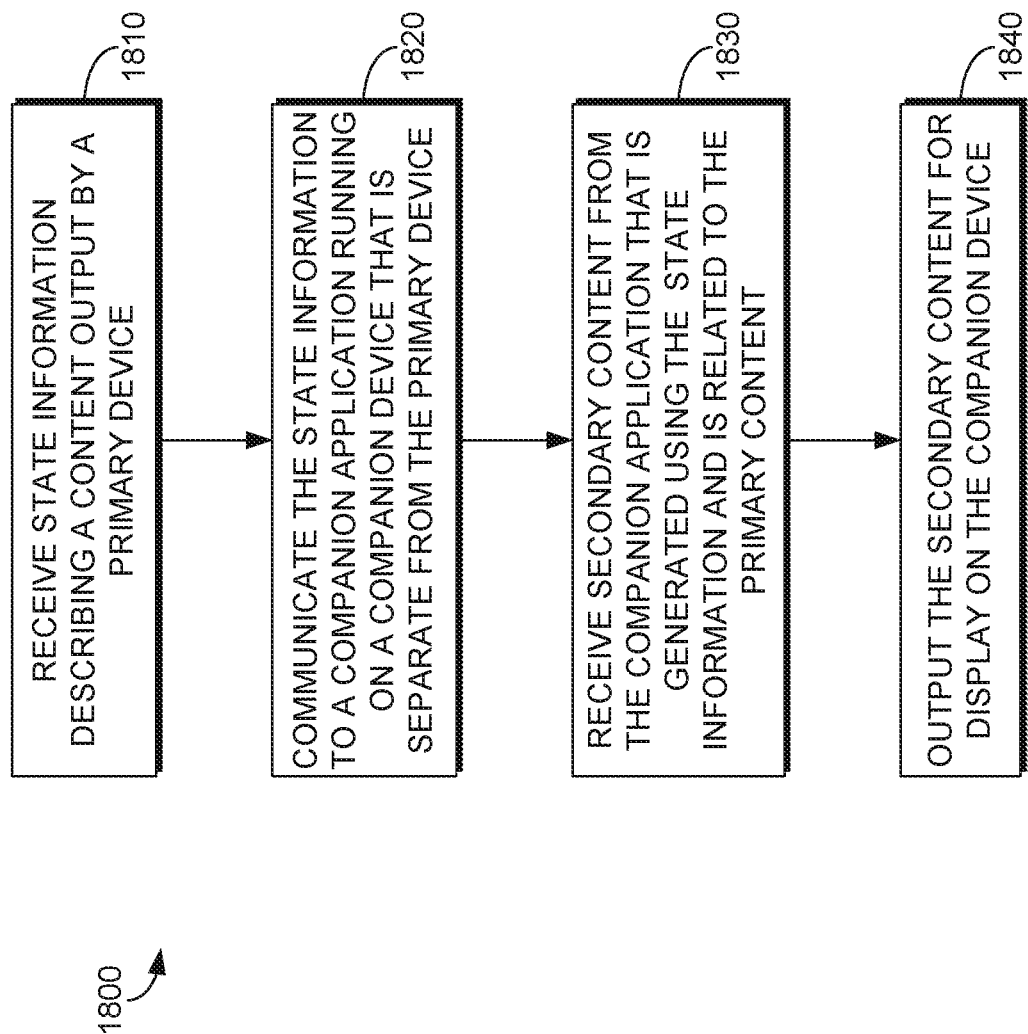
FIG. 18 is a flow chart showing a method of generating a companion experience, in accordance with an embodiment of the present invention.

Turning now to FIG. 18, a method 1800 of generating a companion experience is provided, in accordance with an embodiment of the present invention. At step 1810, state information describing a content output by primary device is received. The state information may identify the primary content, a play head status, and a progress point within the primary content.

At step 1820, the state information is communicated to a companion application running on a companion device that is separate from the primary device. The companion application may be running within a rendering space provided by a host application running on a companion device. The host application may have a counterpart application running on the primary device. The two companion applications may work together to open messaging channels between the primary and companion devices.

At step 1830, secondary content is received from the companion application that is generated using the state information and related to the primary content. The secondary content may be generated by a secondary, or companion application. The secondary content may provide additional information about the primary content. The secondary content may be interactive, allowing the user to perform one or more other tasks.

At step 1840, the secondary content is output for display on the companion device. The secondary content may be output for display within an application campus provided by a host application. The companion application may display a navigation pane or other controls that allow the user to navigate within the host application separately from the controls used to navigate within the companion application.

Companion Experience—Spectator Mode

Spectator mode allows a large number of companion devices to interact with a title playing on a primary device like a game console, media console, or other computer device. In various examples described herein, these devices may be used interchangeably. In some embodiments, hundreds of companion devices may be able to interact with and receive state information for media playing on a game console. Different companion devices may have different levels of access and control over the media content. For example, one or more devices may have full control or floor control over the media content. The devices with full control may change the content, control the progress of the media presentation, authenticate new users that are either full or spectators, and perform other tasks associated with floor control. The spectators may have limited access. For example, the spectators may get state updates to indicate what is playing on the game console, but not be able to otherwise interact with the content. The state information may be used by spectator devices to retrieve activities associated with the primary content. Different users in spectator mode may have different access to different activities based on their own permissions, memberships, and applications loaded on their companion device.

For example, a spectator in a friend's house may receive state information indicating that a particular video game is playing on a game console along with the current game level. The spectator's companion device may identify various activities associated with the particular video game independent of any additional communication with the game console. For example, a companion application on the spectator's device may retrieve help information for a current level or "brag" videos from the Internet. The spectator could also access activities that rely on receiving game information from the game console, if that level of permission is granted. For example, the spectator might be able to view maps showing various players' progress and other information about the game play.

In another example, a spectator may interact with activities pushed to the companion device by the primary device. For example, during a sporting event, poll or trivia questions may be pushed to spectators for them to answer on their companion device. Answers to the poll questions may be aggregated and displayed to a TV connected to the game console or pushed back to the companion devices. Similarly, the percentage of people who correctly answered a trivia question may be displayed along with the first person to correctly enter the answer into their companion device.

In another example, users may switch between spectator and full control. For example, a few users may have full access to the title playing on a computing device, while others have limited access in spectator mode. Floor control may be passed from a full participant to a spectator by making a gesture picked up by a camera, a gesture picked up by a companion device, or by direct input into an interface provided by the primary device. For example, the game console may generate a spectator-mode interface that shows all users currently connected to the game console. Different levels of access may be granted to different users through this interface. For example, a user could be switched from spectator mode into full mode and vice versa.

In one embodiment, even among the companion devices with full access, floor control may automatically pass from user to user. Further, full users may temporarily become spectators depending on the interface. For example, multiple people may have full access to fast forward or pause the media, but as a text input box is opened, only one user is allowed to type into the box. The user that opened the text box in the first place may be the only one with full access. Once the text input is complete, full access may be restored to the other users that previously had full access.

The spectator mode may be facilitated by a central gaming server or media service. In this scenario, communications may be routed from the game console to the service and then from the service to the companion devices through any one of several routes by/through which the companion device may connect to the Internet to communicate with the server. For example, the primary device may provide updates regarding the media progress, and the server could push time-synchronized events to the people registered as spectators.

A variation on spectator mode is bar mode. Bar mode is designed to work in a public setting, such as a sports bar or at a sporting event. The first phase of bar mode may allow the companion device to discover desired media content from one of several media sources in the setting. For example, the user may pick a particular game of interest from several games being displayed in a sports bar.

At a sporting event, the user may be able to access a particular video stream showing a goalie cam, for example. In another embodiment, the user is able to access audio describing the event or part of the sporting event. Once the discovery mode is complete, the user may have access to various activities related to the discovered media content through their companion device. Again, the activities may be provided by applications running on the companion device independent of the source of the selected media. In the alternative, the activities may be pushed to the companion device by a primary device. A hybrid is also possible where the activities are a combination of those discovered by the companion device and those pushed to the companion device by a primary device. In bar mode, the user may have less access to the media than in a more private setting like a home. In general, the user may have access to multiple event streams, but they may not be able to control the media while in spectator mode.

In one embodiment, people within a geographic location, such as a bar or home, are asked to answer a question about the primary content. For example, users could be asked which team or player they are rooting for, anticipated score, anticipate winner, or other questions. In another example, questions about a show's characters, actors, or plot could be asked. The results could be communicated to the group on each device. Further, the results could be tied to prizes for those that provide the correct or most popular answer. The questions put to the group could be submitted by a person hosting the event or the host could be given the opportunity to post questions posed by the group.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of generating a companion experience on a companion device, the method comprising:
   receiving, on a companion device, state information describing a video being output for display by a primary device, wherein the state information identifies the video;
   identifying, by the companion device, social posts related to the video, wherein the social posts are associated with progress points in the video;
   outputting for display on the companion device, which is separate from the primary device, an interface that displays one or more of the social posts;
   receiving through the interface a selection of a skip function displayed adjacent to an individual social post and associated with the individual social post, wherein the skip function causes the video to be skipped to an individual progress point associated with the individual social post when selected; and
   communicating, from the companion device to the primary device, a control instruction to skip the video to the individual progress point associated with the individual social post.

2. The method of claim 1, wherein the state information is received from the primary device.

3. The method of claim 1, wherein the interface is part of a companion application running on the companion device.

4. The method of claim 1, wherein the social posts comprise social posts from a social network of a user associated with the companion device.

5. The method of claim 1, wherein the social posts comprise contextual advertisements that are time-sequenced to the video.

6. The method of claim 1, wherein the social posts include director's commentary for the video.

7. The method of claim 1, wherein the state information comprises a progress update for the video and the social posts are displayed in synchronization with a point in primary content indicated in the progress update and the point indicated in the social posts.

8. One or more non-transitory computer storage media, having computer-executable instructions embodied thereon, that when executed by a computing device perform a method of generating a companion experience, the method comprising:
   receiving, on a companion device, state information describing a video being output for display by a primary device, wherein the state information identifies the video;
   identifying, by the companion device, time-sequenced events that are associated with progress points in the video;
   outputting for display on the companion device one or more of the time-sequenced events;
   receiving a selection of a skip function displayed adjacent to an individual time-sequenced event and associated with the individual time-sequenced event, wherein the selection of the skip function causes the video to be skipped to a progress point associated with the individual time-sequenced event when selected; and
   communicating, from the companion device to the primary device, a control instruction to skip the video to the progress point associated with the individual time-sequenced event.

9. The media of claim 8, further comprising:
   receiving a selection of the individual time-sequenced event and, in response, opening a detail view providing further information related to the individual time-sequenced event.

10. The media of claim 8, wherein the time-sequenced events comprise social posts from a social network of a user associated with the companion device.

11. The media of claim 8, wherein the selection of the skip function comprises selecting a skip control displayed with the individual time-sequenced event.

12. The media of claim 8, wherein the time-sequenced events comprise director's commentary for the video.

13. The media of claim 8, wherein the time-sequenced events comprise a contextual advertisement that is time-sequenced to the video.

14. The media of claim 13, wherein the contextual advertisement is for an item of clothing worn by an actor in the video.

15. A computing system comprising:
a processor; and
computer storage memory having computer-executable instructions stored thereon which, when executed by the processor, implement a method generating a companion experience, the method comprising:
receiving, on a companion device, state information describing a video being output for display by a primary device, wherein the state information identifies the video, wherein the companion device is associated with a user;
identifying, by the companion device, contacts in the user's social network that have made social posts associated with the video, wherein the social posts are associated with progress points in the video;
outputting for display on the companion device a list of one or more of the contacts;
outputting for display on the companion device, which is separate from the primary device, an interface that displays one or more of the social posts;
receiving through the interface a selection of a skip function displayed adjacent to an individual social post and associated with the individual social post, wherein the selection of the skip function causes the video to be skipped to an individual progress point associated with the individual social post when selected; and
communicating, from the companion device to the primary device, a control instruction to skip the video to the individual progress point associated with the individual social post.

16. The system of claim 15, wherein the individual progress point is displayed with the individual social post.

17. The system of claim 15, wherein the one or more social posts comprise social posts from a social network of the user associated with the companion device.

18. The system of claim 15, wherein the state information comprises a progress update for primary content and the social posts are displayed in synchronization with a point in the primary content indicated in the progress update and the point indicated in the social posts.

19. The system of claim 15, wherein the method further comprises using automatic content recognition on an audio signal to determine the state information.

20. The system of claim 15, wherein the interface is part of a companion application running on the companion device.

* * * * *